(12) United States Patent
Edwards et al.

(10) Patent No.: US 9,323,061 B2
(45) Date of Patent: *Apr. 26, 2016

(54) VIEWER WITH DISPLAY OVERLAY

(71) Applicant: Kopin Corporation, Westborough, MA (US)

(72) Inventors: Timothy James Edwards, Scotts Valley, CA (US); Mark Crane, San Jose, CA (US); Cathy Ji Kyung Yoon, Scotts Valley, CA (US); Timothy Brandon Hogan, Allen, TX (US)

(73) Assignee: Kopin Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,275

(22) Filed: Feb. 26, 2014

(65) Prior Publication Data

US 2014/0226214 A1 Aug. 14, 2014

Related U.S. Application Data

(63) Continuation-in-part of application No. 13/800,843, filed on Mar. 13, 2013.

(60) Provisional application No. 61/625,808, filed on Apr. 18, 2012.

(51) Int. Cl.
*G02B 27/14* (2006.01)
*G09G 5/00* (2006.01)
(Continued)

(52) U.S. Cl.
CPC .............. *G02B 27/0189* (2013.01); *F41G 1/38* (2013.01); *G02B 23/10* (2013.01);
(Continued)

(58) Field of Classification Search
CPC ...... G02B 23/10; G02B 23/105; G02B 27/01; G02B 27/0101; G02B 27/0189; G02B 27/017; G02B 2027/0112; G02B 2027/0118; G02B 2027/0138; F41G 1/00; F41G 1/30; F41G 1/38; H04N 5/7491; G09G 5/00; G03B 21/00
USPC ............ 359/629, 630, 636, 639; 345/7–9, 88, 345/102; 353/30, 31, 94; 349/7, 61, 74
See application file for complete search history.

(56) References Cited

U.S. PATENT DOCUMENTS 4,949,089 A 8/1990 Ruszkowski, Jr.
5,103,254 A 4/1992 Bell et al.
(Continued)

FOREIGN PATENT DOCUMENTS

EP 0 803 756 A1 10/1997
GB 2068091 A 8/1981
(Continued)

OTHER PUBLICATIONS

International Preliminary Report on Patentability dated Oct. 21, 2014.
(Continued)

*Primary Examiner* — Loha Ben
(74) *Attorney, Agent, or Firm* — Hamilton, Brook, Smith & Reynolds, P.C.

(57) ABSTRACT

A real-world viewer can include viewing optics positioned along a viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of the images in the real-world scene as viewed in the field of view through the viewing optics. The active display overlay unit can be capable of providing full-color luminance of at least 1200 fL to the ocular of the host system with a luminance to power fL:mW ratio of at least 6:1 or greater or providing monochrome luminance from the active display overlay unit of at least 5000 fL to the ocular of the host system with a luminance to power fL:mW ratio of at least 15:1 or greater.

33 Claims, 16 Drawing Sheets

(51) Int. Cl.
*G02B 27/01* (2006.01)
*F41G 1/38* (2006.01)
*G02B 23/10* (2006.01)
*H04N 5/74* (2006.01)

(52) U.S. Cl.
CPC ......... *G02B 27/0101* (2013.01); *G02B 27/017* (2013.01); *G02B 27/0172* (2013.01); *G02B 23/105* (2013.01); *G02B 2027/0112* (2013.01); *G02B 2027/0118* (2013.01); *G02B 2027/0138* (2013.01); *G09G 5/00* (2013.01); *H04N 5/7491* (2013.01)

(56) References Cited

U.S. PATENT DOCUMENTS

| | | | |
|---|---|---|---|
| 5,311,203 | A | 5/1994 | Norton |
| 6,252,706 | B1 | 6/2001 | Kaladgew |
| 6,516,551 | B2 | 2/2003 | Gaber |
| 7,196,329 | B1 | 3/2007 | Wood et al. |
| 7,295,296 | B1 | 11/2007 | Galli |
| 7,325,320 | B2 | 2/2008 | Gnepf et al. |
| 7,333,270 | B1 | 2/2008 | Pochapsky et al. |
| 7,575,327 | B2 * | 8/2009 | Uchiyama ............... 353/30 |
| 7,654,029 | B2 | 2/2010 | Peters et al. |
| 7,690,145 | B2 | 4/2010 | Peters et al. |
| 7,719,769 | B2 * | 5/2010 | Sugihara et al. .......... 359/630 |
| 7,805,020 | B2 | 9/2010 | Trudeau et al. |
| 7,859,650 | B2 | 12/2010 | Vermillion et al. |
| 7,864,432 | B2 | 1/2011 | Ottney |
| 8,046,951 | B2 | 11/2011 | Peters et al. |
| 8,051,597 | B1 | 11/2011 | D'Souza et al. |
| 8,081,298 | B1 | 12/2011 | Cross |
| 2003/0012035 | A1 | 1/2003 | Bernard |
| 2003/0132860 | A1 | 7/2003 | Feyereisen et al. |
| 2005/0250085 | A1 | 11/2005 | Lemp, III et al. |
| 2009/0205239 | A1 | 8/2009 | Smith, III |
| 2010/0207152 | A1 | 8/2010 | Won |
| 2010/0225833 | A1 | 9/2010 | Methe et al. |
| 2011/0121159 | A1 | 5/2011 | Mourar et al. |
| 2011/0141381 | A1 | 6/2011 | Minikey, Jr. et al. |
| 2012/0075168 | A1 | 3/2012 | Osterhout et al. |
| 2012/0097741 | A1 | 4/2012 | Karcher |
| 2013/0279013 | A1 | 10/2013 | Edwards et al. |

FOREIGN PATENT DOCUMENTS

| | | |
|---|---|---|
| GB | 2 238 627 A | 6/1991 |
| WO | WO 00/73843 A1 | 12/2000 |
| WO | WO 2009/094399 A1 | 7/2009 |
| WO | WO2013/158495 A1 | 10/2013 |

OTHER PUBLICATIONS

Sottilare, et al., "Injecting Realistic Human Models into the Optical Display of a Future Land Warrior System for Embedded Training Purposes", JDMS: Journal of Defense Modeling and Simulation, Apr. 2007. vol. 4, No. 2, 20 pages. <http://www.scs.org/pubs/jdms/vol4num2/LaurieMarshall.pdf>.

Hicks, Jeffery, "Eyekon: Distributed Augmented Reality for Soldier Teams"Papillion, Nebraska: 21st Century Systems, Inc. Accessed May 16, 2012. p. 8-14. <http://www.dodccrp.org/events/8th_IC-CRTS/pdf/118.pdf>.

Recon Instruments, "MOD Live Features", [online] May 16, 2012, Retrieved from the Internet URL: http://www.reconinstruments.com/products/features.

Recon Instruments, "MOD Live GPS", [online] May 16, 2012, Retrieved from the Interntet URL: http//www.reconinstruments.com/products/mod.

Moran, J. And Smith, M.J., "America's Most Deployed Weapon System", PM Soldier Weapons, Briefing for the 31st Annual Firepower Symposium, Mar. 2, 2004, 31 pages. <http://www.dtic.mil/ndia/2004armaments/06_Audette_Fire_Power.pdf>.

Notification of Transmittal of the International Search Report and The Written Opinion of the International Searching Authority for Int'l Application No. PCT/US2013/036400; Entitled: "Viewer With Display Overlay," Date Mailed: Jul. 8, 2013.

Li, Shu et al., "Extra High Luminance Backlight for Helmet-Mounted Display Sighting System for Advanced Rotorcraft," *Proceedings of SPIE*, vol. 4711, pp. 11-19 (Aug. 5, 2002).

* cited by examiner

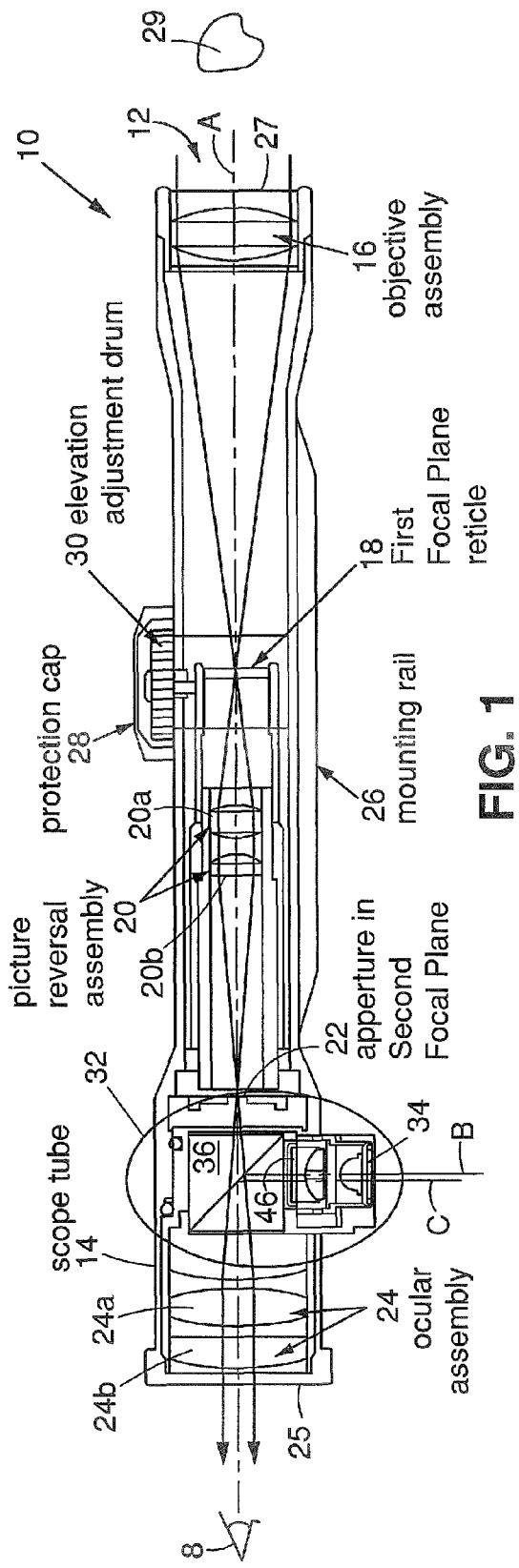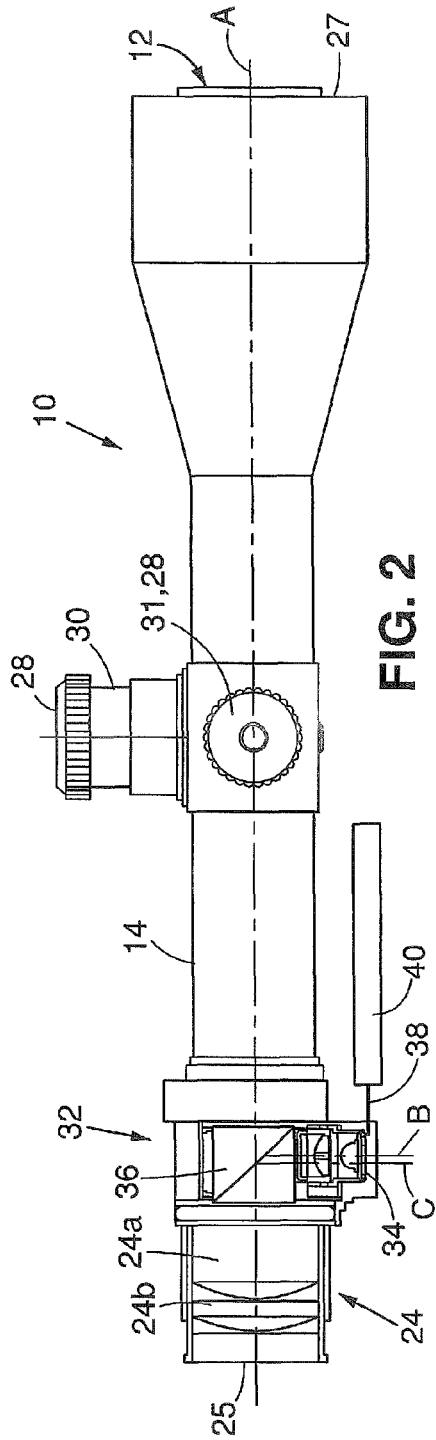

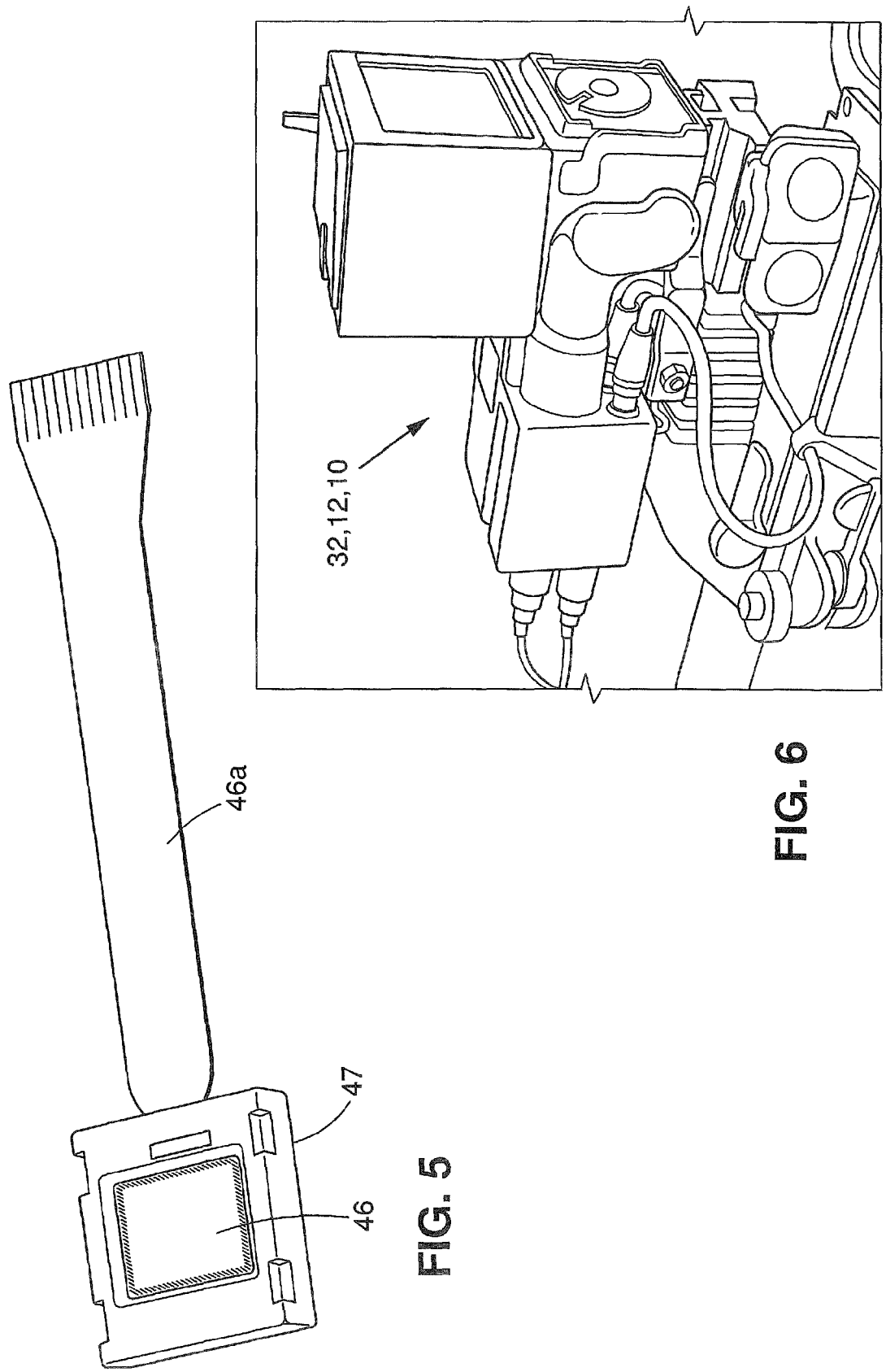

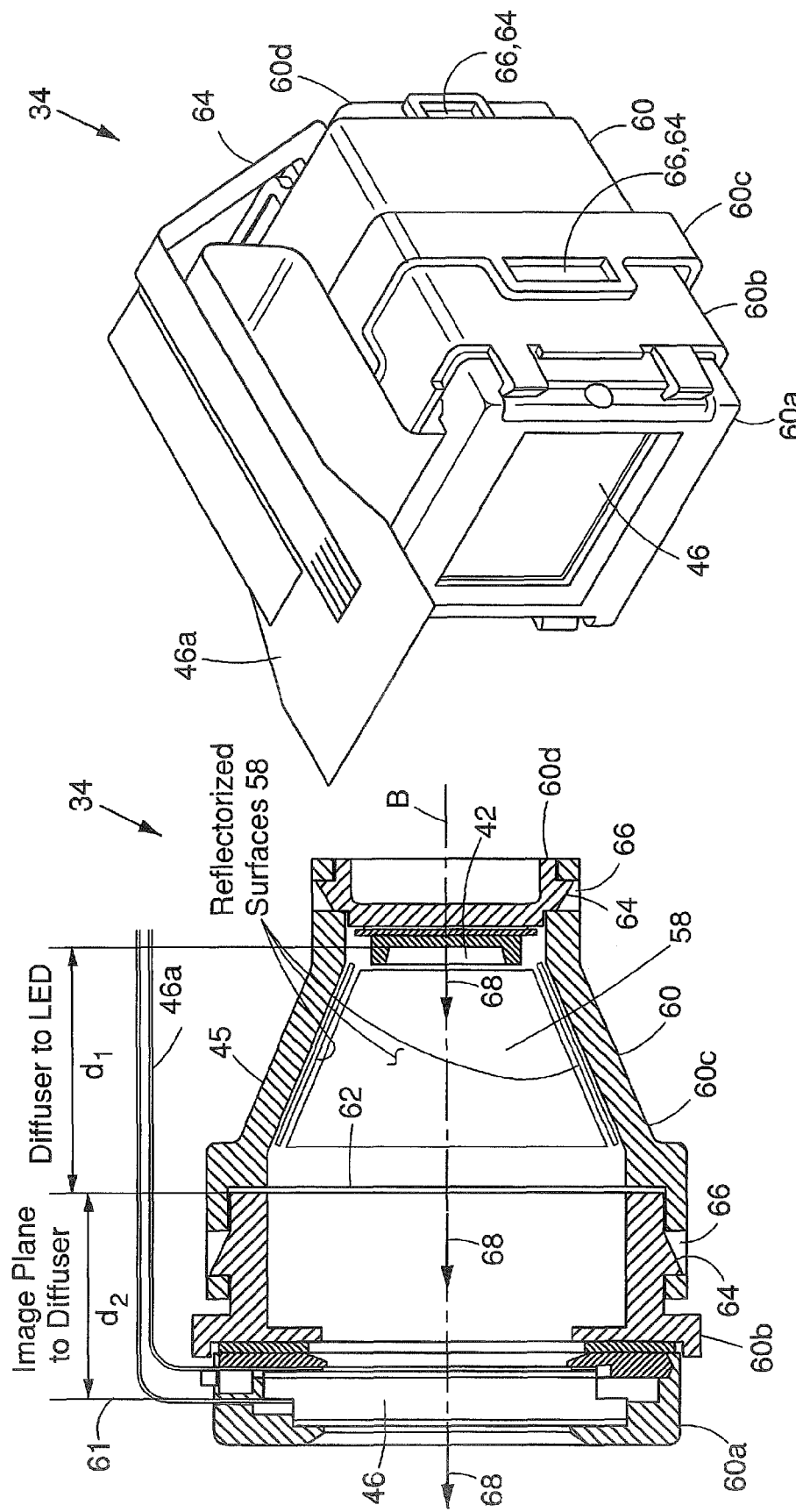

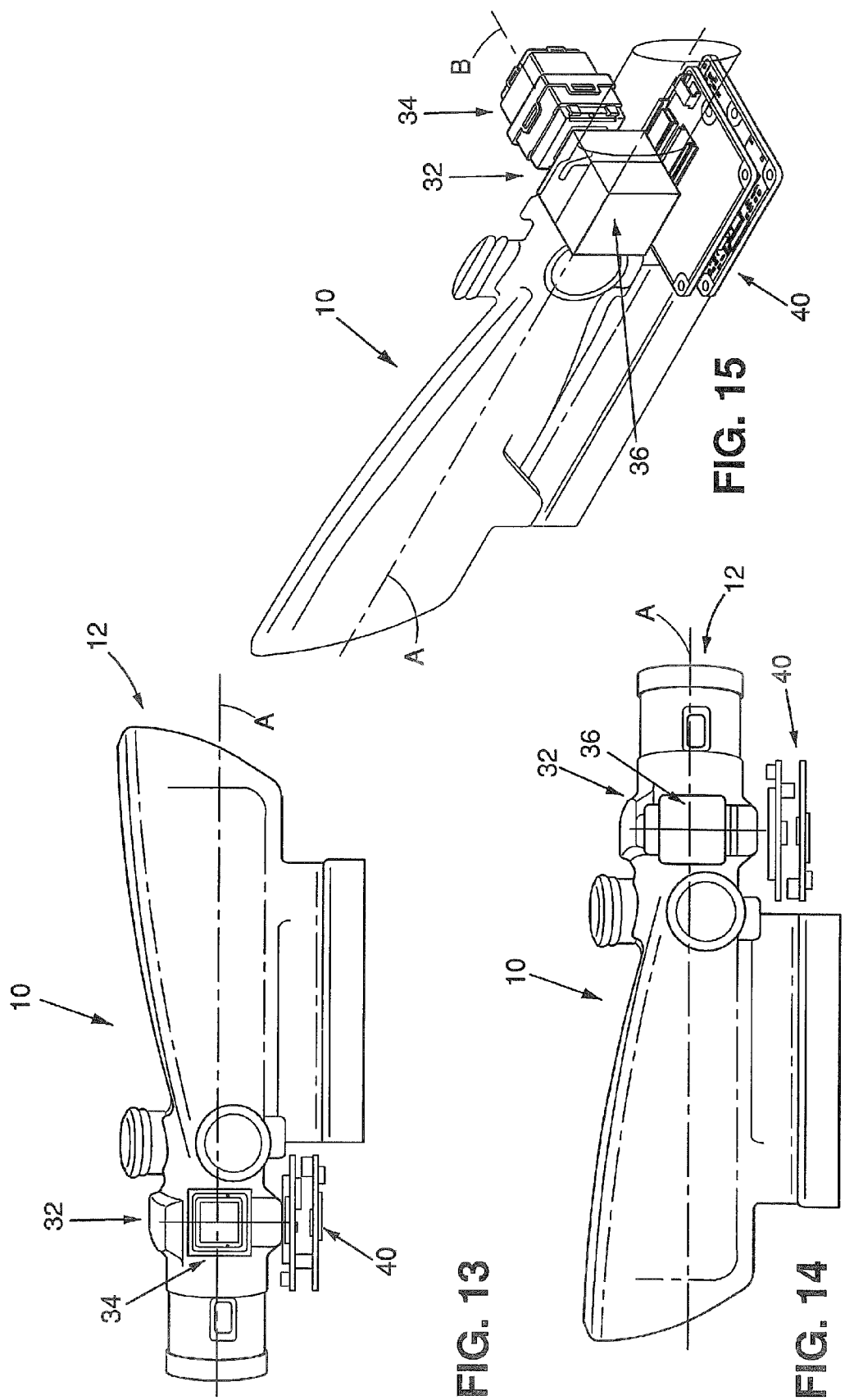

VIEWER WITH DISPLAY OVERLAY

RELATED APPLICATION

This application is a continuation-in-part application of U.S. application Ser. No. 13/800,843, filed on Mar. 13, 2013, which claims the benefit of U.S. Provisional Application No. 61/625,808, filed on Apr. 18, 2012. The entire teachings of the above applications are incorporated herein by reference.

BACKGROUND

Direct view optical weapon sights such as a rifle scope typically have optics with a fixed reticle for viewing and acquiring targets.

SUMMARY

The present invention can provide active display capabilities within a real-world viewer. The real-world viewer can include viewing optics positioned along a viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of the images in the real-world scene as viewed in the field of view through the viewing optics. The active display overlay unit can be capable of providing full-color luminance of at least 1200 fL to the ocular of the host system with a luminance to power FL:mW ratio of at least 6:1 or greater.

In particular embodiments, the viewer can be at least one of a weapon sight, an add-on accessory to a weapon sight, a rifle sight, an add-on accessory to a rifle sight, a surveillance system, an add-on accessory to a surveillance system, a fire-control system, an add-on accessory to a fire-control system, a laser target locator and designator, an add-on accessory to laser target locator and designator, a head or helmet mounted display, an add-on accessory to a head or helmet mounted display, a range finder or an add-on accessory to a range finder. The active display overlay unit can include an active matrix display for generating the images along a display optical axis. A beam combiner can be aligned with the display along the display optical axis, and positioned along the viewing optical axis of the viewing optics for directing the images from the display onto the viewing optical axis for combining with the field of view that is viewed by the viewing optics in an overlaid manner. The viewing optics can be positioned along a longitudinal viewing optical axis. The display optical axis of the active display overlay unit can be at an angle to the viewing optical axis of the viewing optics. The active display overlay unit can include an active matrix transmissive display, and an LED backlight for illuminating the active matrix transmissive display with LED illumination. The LED backlight can be configured to produce or provide a cone angle of illumination from the active matrix transmissive display that substantially matches the viewing cone angle of the viewing optics. The LED backlight can be configured to produce or provide a cone angle of illumination of about +/−10° at the active matrix transmissive display or between +/−6° and +/−15° depending on the viewing optics geometry. The active display overlay unit can include a lens arrangement that matches the led illumination at the transmissive display to the viewing cone of the viewing optics. The lens arrangement can include an integrated lens integrated into the LED backlight and a condenser lens positioned between the integrated lens and the active matrix transmissive display. The active display overlay unit can be capable of providing monochrome luminance of at least 5000 fL to the ocular of the host system with the luminance to power fL:mW ratio of at least 15:1 or greater. Electronics can be included for controlling the active matrix display. The active matrix display can provide images for at least one of an active target reticle, range and wind information, GPS and compass information, target ID, and/or external sensor information and/or video. A housing can be included for containing the viewing optics and the active display overlay unit. The field of view can include target or situational awareness elements therein. The active overlay display unit can be configured to control brightness to allow for viewing under ambient conditions ranging from full sunlight to overcast starlight. The active overlay display unit can be capable of outputting a specific wavelength of imagery and dimming for viewing the real-world and active overlay display unit images using an image intensifier night vision device or thermal imaging device. The active overlay display unit can provide at least one of a monochrome, multi-color and/or full color overlaid image. The active overlay display unit can provide at least one of a bi-level and/or full gray scale overlay image. Mechanical and electrical boresight capabilities can be included to the real-world viewing optical axis. Means can be included to package the active display overlay unit as an integral part of the real-world viewer. The active display overlay unit can be an accessory add-on device to the real-world viewer.

The present invention can also provide a weapons sight including direct viewing optics positioned along a longitudinal viewing optical axis for viewing a field of view of the real-world. An active display overlay unit can be optically coupled to the viewing optical axis of the viewing optics, for generating images and directing the images along the viewing optical axis of the viewing optics for simultaneous overlaid viewing of images in the real-world scene as viewed in the field of view through the viewing optics. The active display overlay unit can be capable of providing full-color luminance of at least 1200 fL to the ocular of the host system with a luminance to power fL:mW ratio at least 6:1 or greater. The active display overlay unit can include an active matrix transmissive display for generating the images along a display optical axis, an LED backlight for illuminating the active matrix transmissive display with LED illumination and configured to provide a cone angle of about +/−10° from the active matrix transmissive display or between +/−6° and +/−15° depending on the viewing optics geometry.

The present invention can also provide a method of viewing with a real-world viewer including viewing the field of view of the real world with viewing optics positioned along a viewing optical axis, and simultaneously viewing images generated by an active display overlay unit optically coupled to the viewing optical axis of the viewing optics. The images can be directed along the viewing optical axis of the viewing optics for simultaneous overlaid viewing of images and the real-world scene as viewed in the field of view through the viewing optics. The active display overlay unit can be capable of providing full-color luminance of at least 1200 fL to the ocular of the host system with the luminance to power fL:mW ratio of at least 6:1 or greater.

In particular embodiments, the viewer can be employed as at least one of a weapon sight, an add-on accessory to a weapon sight, a rifle sight, an add-on accessory to a rifle sight, a surveillance system, an add-on accessory to a surveillance system, a fire-control system, an add-on accessory to afire-control system, a laser target locator and designator, an add-on accessory to laser target locator and designator, ahead or helmet mounted display, an add-on accessory to ahead or helmet mounted display, a range finder, or an add-on accessory to a range finder. The images can be generated in the active display overlay unit with an active matrix display and along the display optical axis. A beam combiner can be aligned with the active matrix display along the display optical axis. The beam combiner can be positioned along the viewing optical axis of the viewing optics for directing the images from the active matrix display onto the viewing optical axis for combining with the field of view that is viewed by the viewing optics in an overlaid manner. The viewing optics can be positioned along a longitudinal viewing optical axis. The display optical axis of the active display overlay unit can be positioned at an angle to the viewing optical axis of the viewing optics. The active matrix display can be an active matrix transmissive display. The active matrix transmissive display of the active display overlay unit can be illuminated with LED illumination from an LED backlight. The LED backlight can be configured to provide a cone angle of illumination from the active matrix transmissive display that substantially matches the viewing cone angle of the viewing optics. A cone angle of illumination of about +/−10° can be provided from the active matrix transmissive display or between +/−6° and +/−15° depending on the viewing optics geometry. The LED illumination can be concentrated onto the active matrix display with a lens arrangement to match the led illumination at the transmissive display to the viewing cone of the viewing optics. The lens arrangement can be provided with an integrated lens integrated in the LED backlight and a condenser lens can be positioned between the integrated lens and the active matrix transmissive display. Monochrome luminance can be provided from the active display overlay unit to the ocular of the host system of at least 5000 fL with a luminance to power fL:mW ratio of 15:1 or greater. The active matrix display can be controlled with electronics. The active matrix display can provide images for at least one of an active target reticle, range and wind information, GPS and compass information, target ID, and/or external sensor information. The viewing optics and the active display overlay unit can be contained within a housing. Target or situational awareness elements can be viewed in the field of view. The active matrix display brightness can be controlled to allow for viewing under ambient conditions ranging from full sunlight to overcast starlight. A specific wavelength of imagery and dimming of the active overlay display unit can allow for viewing the real-world and active overlay display unit images using an image intensifier night vision device or thermal imaging device. At least one of a monochrome, multi-color and/or full color overlaid image can be provided. A bi-level and/or full gray scale overlay image can be provided. Mechanical and electrical boresight capabilities to the real-world viewing optical axis can be provided. Means to package the active display overlay unit as integral part of the real world viewer can be provided. The active display overlay unit can be an accessory add-on device to the real-world viewer.

The present invention can also provide a method of viewing with a weapons sight including viewing afield of the real-world with direct viewing optics positioned along a longitudinal viewing optical axis, and simultaneously viewing images generated by an active display overlay unit optically coupled to the viewing optical axis of the viewing optics. The images can be directed along the viewing optical axis of the viewing optics for simultaneous overlay viewing of images and the real-world scene as viewed in the field of view through the viewing optics. The active display overlay unit can provide full-color luminance of at least 1200 fL to the ocular of the host system with a luminance to power fL:mW ratio at least 6:1 or greater. The active display overlay unit can include an active matrix transmissive display generating the images along a display optical axis, an LED backlight illuminating the active matrix transmissive display with LED illumination and configured to provide a cone angle of about +/−10° from the active matrix transmissive display or between +/−6° and +/−15° depending on the viewing optics geometry.

The present invention can also provide a viewer including an active display overlay unit for optically coupling to a viewing optical axis of viewing optics, for generating images and directing the images along the viewing optical axis of the viewing optics for simultaneous overlaid viewing of the images and a real-world scene as viewed in a field of view through the viewing optics. The active display overlay unit is capable of providing at least one of monochrome and full color luminance of at least 1200 fL to the ocular of the host system with at least a portion having a luminance to power fL:mW ratio of at least 6:1 or greater.

In particular embodiments, the active display overlay unit can include an active matrix display for generating the images along the display optical axis. A beam combiner can be aligned with the display along the display optical axis, and positioned along the viewing optical axis of the viewing optics for directing the images from the display onto the viewing optical axis for combining with the field of view that is viewed by the viewing optics in an overlaid manner. Embodiments can include an active matrix transmissive display and an LED backlight for illuminating the active matrix transmissive display with LED illumination. The LED backlight can be configured to provide a cone angle of illumination at the active matrix transmissive display that substantially matches the viewing cone angle of the viewing optics.

The viewer can further include the viewing optics, and the active display overlay unit can be an add-on accessory coupled adjacent to an eyepiece of the viewing optics by an adapter. A sensor can sense ambient scene illumination for controlling brightness of the active display overlay unit as a function of ambient scene illumination. A sensor can also put the active display overlay unit into sleep mode in the absence of a user looking through the viewer. The active display overlay unit can be configured for operating in multiple modes, including day, night and sleep. The active display overlay unit can be configured with a brightness range and dimming capability to be fully day time readable and night time viewable with the aid of night vision goggles. The active display overlay unit can be configured to provide monochrome in multiple narrow band colors. The active display overlay unit can be configured to provide at least one of low power bi-level symbology and full 24 bit full-color information to the user. An adapter can be configured to secure the active display overlay unit to the viewing optics of multiple optical platforms including weapon sights, sighting systems, binoculars, telescopes and microscopes. Optical viewing conditions and parameters of the viewing optics can be preserved following integration with the active display overlay unit, including at least one of ocular focus, zoom, parallax, range and windage turret adjustment and illuminated reticle adjustments. The viewing optics can have an existing boresight which is not impacted when the active display overlay unit is integrated with the viewing optics.

The active display overlay unit can be capable of interfacing with an external night vision system including long wave infrared, short wave infrared and solid state low light level sensors to provide an overlay of the night vision scene onto the real world scene. The active matrix display can provide images for at least one of target hand off, battlefield situational awareness, active target reticle, range and wind information, GPS and compass information, target ID, identification friend or foe, and/or external sensor information. The active display overlay unit can include a backlight regulation system, for maintaining consistent brightness over variations in temperature and construction. An automatic brightness control system can maintain constant symbology contrast with respect to ambient environment. The backlight regulation system can provide greater than $10^7$ dimming range for operation conditions from full sunlight to viewing through an image intensifier device, with consistent brightness over all temperatures and process variations. The active display overlay unit can include a microdisplay with custom backlight color, display color and filter combinations for optimum day mode power in conjunction with video I/O modes. The active display overlay unit can be capable of displaying at least one of a disturbed reticle and laser range finder aiming pointer over the real-world scene in conjunction with orientation/ camp sensors. The viewing optics can include a photo-patterned internal reticle and the viewer can further include a sensor arrangement for automatically measuring boresight to a photo-patterned reticle. The sensor arrangement can include at least one of positional orientation sensors and image sensors that see the photo-patterned reticle and optical scene for overlaying and aligning electronic imagery from at least one of a night vision sensor and a disturbed reticle.

A clamping system can secure the active display overlay unit to multiple sights having varying diameters. The clamping system can mount the active display overlay unit to a selected sight on multiple locations which can include top and lateral side locations.

The active display overlay unit can include dual path processing and power consumption for symbology and video modes of operation. A symbology display system can implement simultaneous static and dynamic symbology layers that allow moving symbology to overlap static symbology without redrawing the static symbology. A double buffered bi-level symbology system can allow objects to be drawn, moved and erased without flickering or partial redraws being visible to the user. An immediate/deferred draw graphics rendering scheme can allow multiple graphics to be rendered to an active matrix display with only a single synchronization operation, allowing multiple on-screen graphics to change every frame without flickering or partially drawn objects being visible to the user. Dual path bi-level symbology and full digital video processing can allow power efficient operation and bi-level mode with capability to provide full video and symbology overlay.

The present invention can also provide a weapons sight including direct viewing optics positioned along a longitudinal viewing optical axis for viewing a field of view of the real-world. An add-on accessory active display overlay unit can be optically coupled to the viewing optical axis of the viewing optics by an adapter, for generating images and directing images along the viewing optical axis of the viewing optics for simultaneous overlaid viewing of images in the real-world scene as viewed in the field of view through the viewing optics. The active display overlay unit is capable of providing at least one of monochrome and full color luminance of at least 1200 fL to the ocular of the host system with at least a portion having a luminance to power fL:mW ratio of at least 6:1 or greater. The active display overlay unit can include an active matrix transmissive display for generating the images along a display optical axis, and an LED backlight for illuminating the active matrix transmissive display with LED illumination.

The present invention can also provide a method of viewing with a real-world viewer including viewing a field of view of the real-world with viewing optics positioned along a viewing optical axis, and simultaneously viewing images generated by an active display overlay unit optically coupled to the viewing optical axis of the viewing optics. The images can be directed along the viewing optical axis of the viewing optics for simultaneous overlaid viewing of the images and the real-world scene is viewed in the field of view through the viewing optics. The active display overlay unit is capable of providing at least one of monochrome and full color luminance of at least 1200 fL to the ocular of the host system with at least a portion having a luminance to power fL:mW ratio of at least 6:1 or greater.

In particular embodiments, the images can be generated in the active display overlay unit with an active matrix display and along a display optical axis. A beam combiner can be aligned with the active matrix display along the display optical axis. The beam combiner can be positioned along the viewing optical axis of the viewing optics for directing the images from the active matrix display onto the viewing optical axis for combining with the field of view that is viewed by the viewing optics in an overlaid manner. The active matrix display can be an active matrix transmissive display and can be illuminated with an LED backlight. The LED backlight can be configured to provide a cone of angle of illumination at the active matrix transmissive display that substantially matches the viewing cone angle of the viewing optics.

The active display overlay unit can be coupled as an add-on accessory adjacent to an eyepiece of the viewing optics with an adapter. Ambient scene illumination can be sensed with a sensor for controlling brightness of the active display overlay unit as a function of ambient scene illumination. The active display overlay unit can be put into sleep mode with a sensor that senses the absence of a user looking through the viewer. The active display overlay unit can be configured to operate in multiple modes including day, night and sleep. The active display overlay unit can be configured to have a brightness range and dimming capability to be fully day time readable and night time viewable with the aid of night vision goggles. The active display overlay unit can be configured to provide monochrome and multiple narrow band colors. The active display overlay unit can be configured to provide at least one of low power bi-level symbology and full 24 bit full color information to the user. The active display overlay unit can be secured to the viewing optics of multiple optical platforms including weapon sights, sighting systems, binoculars, telescopes and microscopes with an adapter. Optical viewing conditions and parameters of the viewing optics can be preserved following integration with the active display overlay unit, including at least one of ocular focus, zoom, parallax, range and windage turret adjustment and illuminated reticle adjustments. An existing boresight of the viewing optics can be preserved when the active display overlay unit is integrated with the viewing optics.

The active display overlay unit can be interfaced with an external night vision system including long wave infrared, short wave infrared and solid state low light level sensors to provide an overlay of the night vision scene onto the real-world scene. The active matrix display can be provided with images for at least one of target hand off, battlefield situational awareness, active target reticle, range and wind information, GPS and compass information, target ID, identification of friend or foe, and/or external sensor information. Consistent brightness in the active display overlay unit can be maintained over variations in temperature and construction with a backlight regulation system. Constant symbology contrast with respect to ambient environment can be maintained in the active display overlay unit with an automatic brightness control system. The backlight regulation system can provide greater than $10^7$ dimming range for operation conditions from full sunlight to viewing through an image intensifier device, with consistent brightness over all temperatures and process variations. The microdisplay can have custom backlight color, display color and filter combinations for optimum day mode power in conjunction with video I/O modes. The active display overlay unit can display at least one of a disturbed reticle and laser range finder aiming pointer over the real-world scene in conjunction with orientation/cant sensors. The viewing optics can include a photo-patterned reticle, and a sensor arrangement can automatically measure boresight to the photo-patterned reticle. At least one of positional orientation sensors and image sensors can sense the photo-patterned reticle and optical scene for overlaying and aligning electronic imagery from at least one of a night vision sensor and a disturbed reticle.

The active display overlay unit can be secured to multiple sights having varying diameters with a clamping system. The clamping system can mount the active display overlay unit to a selected sight on multiple locations, which can include top and lateral side locations.

The active display overlay unit can be provided with dual path processing and power consumption for symbology and video modes of operation. Simultaneous static and dynamic symbology layers can be implemented that allow moving symbology to overlap the static symbology without redrawing the static symbology, with a symbology display system. A double buffered bi-level symbology system can allow objects to be drawn, moved and erased without flickering or partial redraws being visible to the user. Multiple graphics can be rendered to an active matrix display with only a single synchronization operation with an immediate/deferred draw graphics rendering scheme, allowing multiple on-screen graphics to change every frame without flickering or partially drawn objects being visible to the user. Dual path bi-level symbology and full digital video processing can allow power efficient operation in bi-level mode with capability to provide full video and symbology overlay.

The present invention can also provide a method of viewing with a weapons sight, including viewing a field of the real-world with direct viewing optics positioned along a longitudinal viewing optical axis and simultaneously viewing images generated by an add-on accessory active display overlay unit optically coupled to the viewing optical axis of the viewing optics by an adapter. The images can be directed along the viewing optical axis of the viewing optics for simultaneous overlaid viewing of the images and the real-world scene as viewed in the field of view through the viewing optics. The active display overlay unit can provide at least one of monochrome and full color luminance of at least 1200 fL to the ocular of the host system with at least a portion having luminance to power fL:mW ratio of at least 6:1 or greater. The active display overlay unit can include an active matrix transmissive display generating images along a display optical axis. An LED backlight can illuminate the active matrix transmissive display with LED illumination.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a schematic side sectional view of an embodiment of a sight, scope or viewer in the present invention.

FIG. 2 is a side view of another embodiment of a sight, scope or viewer in the present invention with a portion in section showing an embodiment of an active display overlay unit.

FIG. 5 is a perspective view of an embodiment of an active matrix display.

FIG. 6 is a perspective view of an embodiment of the present invention including a crew served weapon sight.

FIG. 7 is a side sectional view of one embodiment of a backlight/display module or assembly.

FIG. 10 is a perspective view of another embodiment of a backlight/display module or assembly.

FIG. 13-15 are views from three different directions of an embodiment in the present invention.

DETAILED DESCRIPTION

Figure 3:
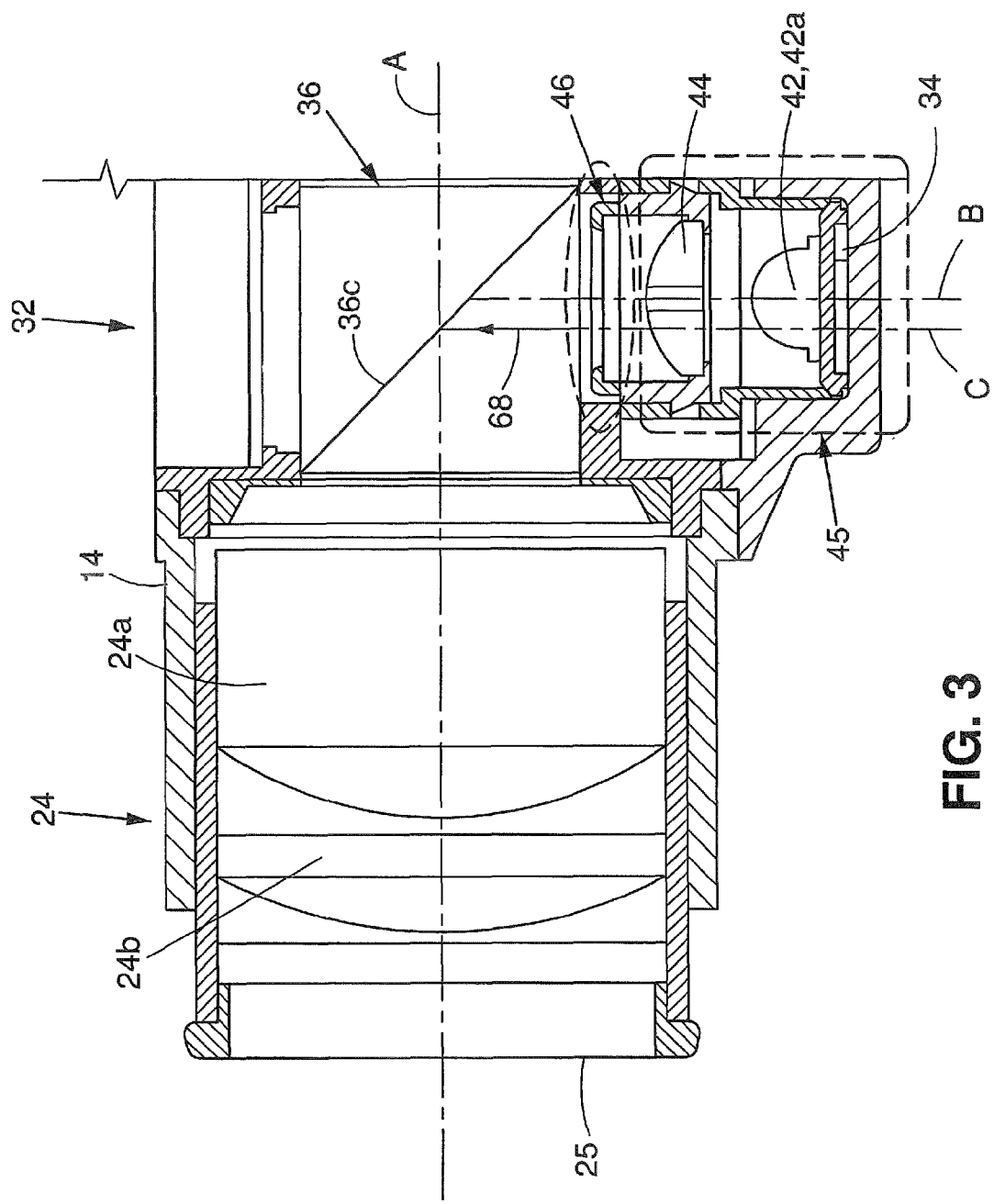
FIG. 3 is an enlarged view of the sectional portion of FIG. 2.
Figure 4:
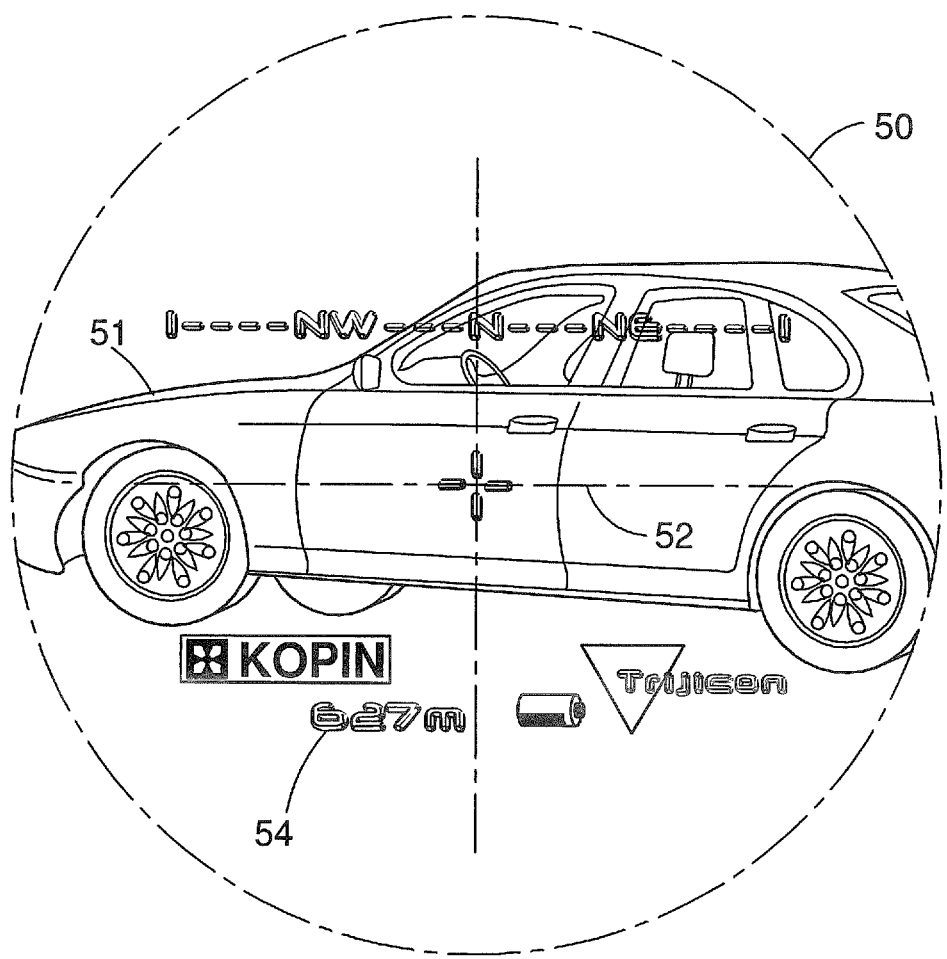
FIG. 4 is an example of the view through the optics of an embodiment of the present invention, in which the real world can be simultaneously viewed with overlaid images.

Referring to FIGS. 1-3, viewer 10 can be a display or viewing apparatus, device, sight, or scope in the present invention, which can be for or on, or part of a weapon, gun, rifle, surveillance system, fire-control system, laser target locater, range finder, or as an add-on accessory thereto. Embodiments can be mounted on a weapon, or apparatus, or can be hand held or helmet mounted. In one embodiment, viewer 10 can be used as a weapon, rifle or gun sight or scope, and can include direct visual optics, or direct view or viewing optics 12, positioned within a scope tube, assembly or optics housing 14 along viewing optical axis A, such as an inline longitudinal axis, for viewing real-world images 51 (FIG. 4). The optics 12 can have a viewing input end 27, and a viewing output end or eyepiece 25, which can be aligned along viewing optical axis A, and can be inline. Objects or targets 29 can be directly viewed with viewer 10 by the eye 8 of the user through the viewing input end 27, along the viewing direct view optics 12, and out the viewing output end 25. The viewing optics 12 can include an objective lens or lens assembly 16 at the viewing input end 27. A first focal plane reticle 18 can be positioned and spaced rearwardly along the viewing optical axis A from the objective lens assembly 16. A picture or image reversal lens assembly 20 can be positioned and spaced rearwardly along the viewing optical axis A from the first focal plane reticle 18. The picture reversal assembly 20 can include two lenses 20a and 20b spaced apart from each other. An aperture in a second focal plane 22 can be positioned and spaced rearwardly along the viewing optical axis A from the picture reversal assembly 20. An ocular lens assembly 24 can be positioned and spaced rearwardly along the viewing optical axis A from the aperture in the second focal plane 22, at the eyepiece 25. The ocular lens assembly can include two lenses 24a and 24b spaced apart from each other. Lenses 24a and 24b can include more than one lens element. In some embodiments, the viewing optical axis A and the direct viewing optics 12 can be folded.

An active display overlay unit 32 can be optically coupled to the viewing optical axis A of the direct viewing optics 12 for generating images (54 (FIG. 4) with an active matrix display 46 and directing the images 54 along the optical axis A for simultaneous overlaid viewing of the generated images 54 and images 51 of the real-world scene, including targets 29, when looking through the direct viewing optics 12 through eyepiece 25. The active display overlay unit 32 can direct generated images 54 along a display optical axis B, which can be at any angle to viewing optical axis A, such as at a right angle. The images 54 can be redirected from the display optical axis B onto the viewing optical axis A with a beam combiner 36 for simultaneously superimposing or overlaying the images 54 onto the images 51 of the scene viewed by the viewer through the optics 12. The active display overlay unit 32 can include a backlight/display device, apparatus, assembly, module or arrangement 34 for generating the images 54, and a beam combiner 36 for combining the images 54 with the images 51 of the direct viewing optics 12. The beam combiner 36 of the active display overlay unit 32 can be positioned on and optically coupled to viewing optical axis A, between lens assemblies 20 and 24, such as between the aperture in the second focal plane 22 and the ocular lens assembly 24. The active matrix display 46 can generate images 54 that can include text, alpha-numerics, graphics, symbology and/or video imagery, icons, etc., including active target reticles, range measurements and wind information, GPS and compass information, target finding, recognition and identification (ID) information, and/or external sensor information (sensor video and/or graphics), or images for situational awareness, for viewing through the eyepiece 25 along with the images 51 of the view seen through optics 12. The direct viewing optics 12 can include or maintain the existing reticle and bore sight, and retain high resolution.

The beam combiner 36 can provide the optical function that combines the direct viewing optics 12 see through path along viewing optical axis A, with the display overlay path along display optical axis B. The center line C of the beam combiner 36 can be offset from the display optical axis B, by a small amount. In some embodiments, the center line C can be aligned with axis B. The beam combiner 36 can have a partially reflecting coating or surface 36c that reflects and redirects the output or at least a portion of the active matrix display 46 output from axis B onto axis A to the viewer's eye 8 at eyepiece 25 while still providing good transmissive see-through for the direct viewing optics 12 path. The beam combiner 36 can be a beam splitter cube made of optical material, such as optical glass or plastic materials with a partially reflective coating 36c. The coating 36c can be a uniform and neutral color reflective coating, or can be tailored with polarizing, spectrally selective or patterned coatings to optimize both the transmission and reflection properties in the eyepiece 25. The polarization and/or color of the coating 36c can be matched to the display 46. This can optimize reflectance and efficiency of the display optical path with minimal impact to the direct viewing optics 12 transmission path. Although the beam combiner 36 is shown as a cube, in some embodiments, the beam combiner 36 can have different optical path lengths for the active display overlay unit 32 or display 46 along display optical axis B, and the direct viewing optics 12 along viewing optical axis A. In some embodiments, the beam combiner 36 can be of a plate form, where a thin reflective/transmissive plate can be inserted in the direct viewing optics 12 path across the optical axes A and B.

Referring to FIGS. 2 and 3, the active matrix display 46 can be a reflective, transmissive or an emissive microdisplay, and can be a microdisplay such as a Kopin Corporation, Taunton, Mass., transmissive active matrix LCD display (AMLCD). The active matrix display 46 can be monochrome or can provide full color, and in some embodiments, can provide multi-color. In other embodiments, other suitable designs or types of displays can be employed. The active matrix display 46 can be driven by electronics 40, via line 38 (FIG. 2). The electronics 40 can include the ability to generate display symbols, format output for the display, and include battery information, batteries, or connect to batteries, power conditioning circuitry, video interface, serial interface and control features. Other features can be included for additional or different functionality of the active display overlay unit 32. The electronics 40 can provide display functions, or can receive such functions from another device in communication therewith.

The active matrix display 46 can be part of a backlight/display assembly, module or arrangement 34, having a backlight assembly 45 including a backlight illumination or light source, device, apparatus or member 42, such as an LED backlight for illuminating the active matrix display 46 with light 68. In some embodiments, the backlight source 42 can be a large area LED and can include a first or an integrated lens 42a, for collecting and directing generated light 68 to a second, illumination or condenser lens 44, for collecting, concentrating and directing the light 68 onto active matrix display 46, along display optical axis B, with good spatial and angular uniformity. The illuminated images 54 from active matrix display 46 are then directed to the beam combiner 36 for combining with images 51 seen through the direct viewing optics 12, for viewing at eyepiece 25. The backlight assembly 45, active matrix display 46, and the active display overlay unit 32 are able to provide images 54 with sufficient high brightness luminance to be simultaneously viewed with a very high brightness real world view through optics 12, while being at low power. The backlight 42 color can be selected to be any monochrome color, or can be white to support a full color microdisplay. Other backlight design elements can be included, such as other light sources, waveguides, diffusers, micro-optics, polarizers, birefringent components, optical coatings and reflectors for optimizing performance of the backlight 42, and which are compatible with the overall size requirements of the active display overlay unit 32, and the luminance, power and contrast needs.

When the viewer 10 is a weapon sight such as a gun or rifle sight or scope, the viewer 10 can still allow the existing features of the direct view optics sight to be provided such as target finding, target recognition, target identification, range measurement and targeting. The existing direct viewing optics 12 can maintain the existing reticle and boresight, and can retain the high resolution direct viewing optics 12 image. Additional capabilities provided by the active display overlay unit 32 can include an active target reticle, display of range and/or wind information, display GPS and/or compass information, display target identification (ID), and display an external sensor image overlayed with the direct viewing optics 12 (sensor video and/or graphics). Prior art direct viewing sights typically incorporated fixed or mechanically adjustable reticles or targeting references, while the active display overlay unit 32 can provide electrically dynamic information and targeting references which provides enhanced capability. Spectrally selective and polarized coatings 36c can be used to provide efficient see through directing viewing optics 12 with efficient reflectance for the active display overlay unit 32.

FIG. 4 depicts an example of the view through an embodiment of viewer 10, showing the viewed or image field 50 which includes real world images 51 seen through the direct viewing optics 12, as well as overlayed images 54 from the active display overlay unit 32. The direct viewing optics 12 can include an existing reticle or cross hair 52 visible in the image field 50, which can be fixed or mechanically adjustable. The overlayed images 54 shown, include examples of compass information, an active target reticle, battery information, icons, text, and range information. It is understood that depending upon the embodiment or desired functionality, additional images can be overlayed to include further features, including those previously described. Also the active display overlay unit 32 can be controlled by electronics 40 to switch between different functions to show different images 54 or groupings of images 54 at a given moment in time.

In the embodiment seen in FIGS. 1 and 2, the optics housing 14 of the viewer 10 can include a mounting rail 26 for mounting to a desired weapon, equipment or device, and can have an adjustment mechanism 30 including an elevation adjustment drum for adjusting the elevational position of the optics 12. A lateral adjustment mechanism 31 (FIG. 2) similar to mechanism 30 is also typically provided for side-to-side adjustment. The adjustment mechanisms can be covered with a protection cap 28.

Referring to FIG. 5, in one embodiment, active matrix display 46 can have a frame 47 and can be connected to a flexible or flex cable 46a that provides power and control signals to the display 46. Active matrix display 46 in one embodiment, can be a Kopin LV64OM Monochrome AMLCD with a resolution of 640×480 pixels, 15 μm×15 μm pixel size, 9.6 mm×7.2 mm image plane size, typical power of 20 milliwatts (mW), an integrated flex connector cable 46a, internal heaters for cold temperature operation, an operating temperature of −40° C. to 65° C. and a storage temperature of −50° C. to 86° C. In other embodiments, active matrix display 46 can have full color, multi-color, other resolutions, pixel sizes, dimensions and specifications, and other suitable displays or types of displays or designs can be used. Light shielding can be included in some embodiments.

FIG. 6 depicts an example of an embodiment of a viewer 10 including a 1× crew served weapon sight with direct viewing optics 12. The active display overlay unit 32 can include a plate beam combiner 36, and backlight/display assembly 34 with high brightness such as seen in FIG. 7. The backlight/display assembly 34 can have a 640×480 monochrome active matrix display 46, can have at least about 1200 fL or greater luminance at 200 milliwatts (mW), can have about 200:1 or greater contrast and about a 1,000,000:1 dimming range. A 1200 fL or greater luminance at 200 mW can provide a luminance to power fL:mW ratio of 6:1 or greater. Some embodiments can have full color luminance. Such luminance provided to the viewing optical axis A can allow viewing of images 54 in the daytime. The content can include an overlay reticle system from active display overlay unit 32, and can include a daytime and image intensifier tube ($I^2T$) viewable overlay reticle/thermal system. The backlight/display assembly 34 can include a housing 60 for housing and positioning an LED light source 42, a diffuser 62 and active matrix display 46 along display optical axis B. The housing 60 can be formed by more than one component assembled together, such as housing portions 60a, 60b, 60c and 60d, which can be assembled together to house and hold display 46, diffuser 62 and light source 42 in position. Portions or all of the housing 60 can be made of aluminum to act as a heat sink for light source 42. Housing portion 60c can have outwardly angling reflecting or reflectorized surfaces 58 extending between light source 42 and diffuser 62, for reflecting and directing light 68 to the diffuser 62. The light source 42 in some embodiments can be a quad amber LED, and can be spaced or positioned apart from or behind the diffuser 62 by a distance $d_1$, such as about 8 mm. The diffuser 62 can be spaced or positioned apart from or behind the active matrix display 46 by a distance $d_2$, such as about 7 mm. The reflecting surfaces 58 can collect and direct light 68 from light source 42 to increase the efficiency of the light delivery to active matrix display 46. The reflecting surfaces 58 can angle about 25° relative to display optical axis B from a position slightly wider than the light source 42 to a position about the width or size of diffuser 62. It is understood that the sizes, shapes, dimensions and specifications can be varied to suit different situations.

Figure 8:
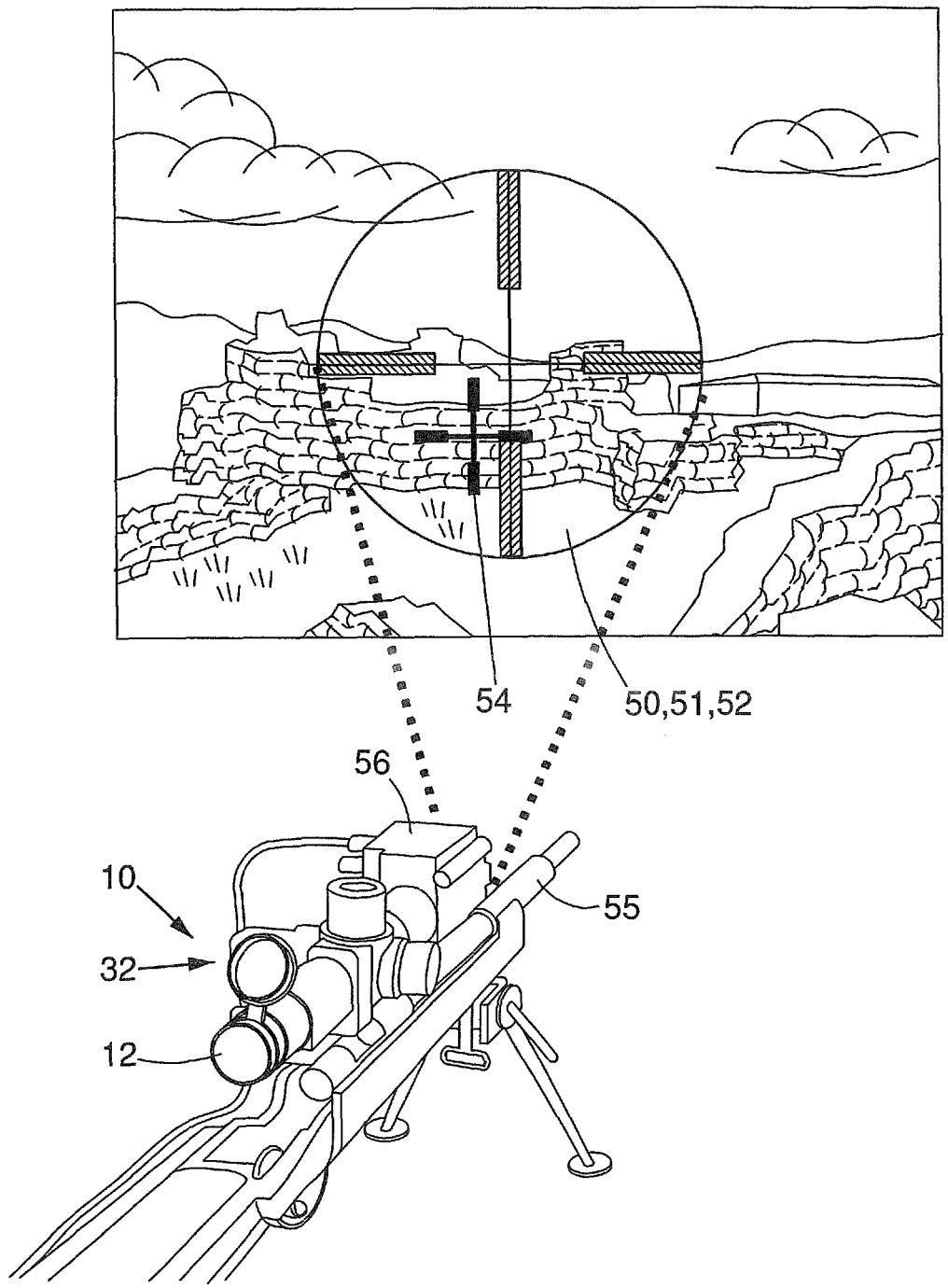
FIG. 8 is a perspective view of an embodiment of the present invention including a sniper sight overlay on a rifle and further showing a representation of the view through the optics.

FIG. 8 depicts an example of an embodiment of a viewer 10 mounted to a weapon such as a sniper rifle, including a variable magnification sniper sight or scope as the direct viewing optics 12, such as a 3.5-15×50 mm sniper sight. A view or image field 50 is also represented, showing real-world images 51 and an existing fixed reticle 52 seen through the direct viewing optics 12, as well as overlayed images 54 from the active display overlay unit 32, which can include an overlay reticle. A sniper sight, sighting device or apparatus 56 can also be mounted to the rifle 55 for measuring all relevant physical phenomena that can influence ballistic trajectory and calculate and display the offset aim point and confidence metric in the scope or direct viewing optics 12. The sighting device 56 can provide the ability to see the aim point on the target in both day and night, and can enable rapid target identification, weapon alignment, and measurement of range to target and crosswind profile. The sighting device 56 can be in communication with the active display overlay unit 32 for displaying images 54 in the image field 50, and can be mounted to the weapon 55 or can be separate. Some embodiments of sighting devices 56 can be positioned in front of the direct viewing optics 12.

Figure 9:
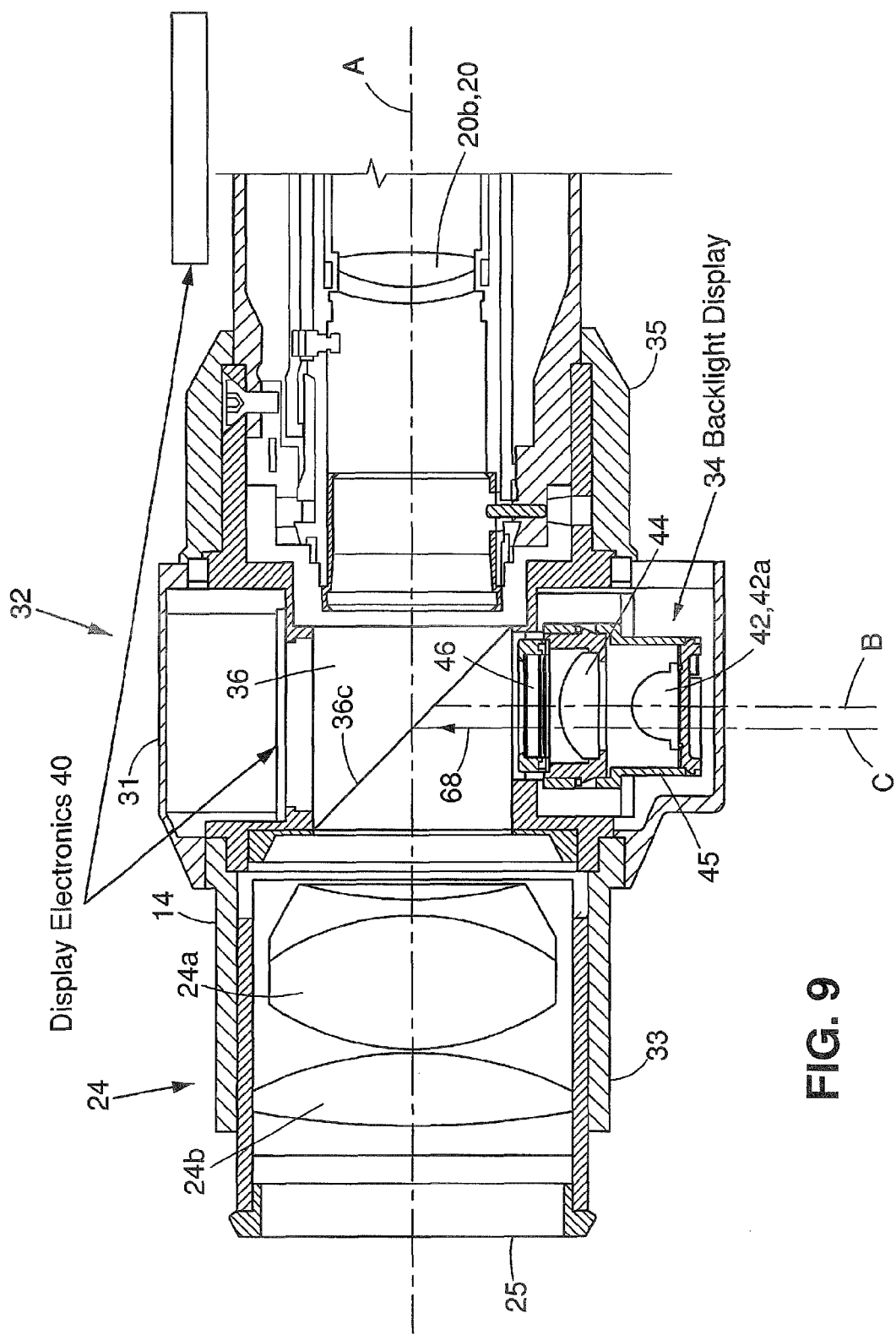
FIG. 9 is an enlarged side sectional view of a portion of an embodiment of a sight, scope or viewer in the present invention showing an embodiment of an active display overlay unit.

Referring to FIG. 9, the embodiment of the active display overlay unit 32 in FIG. 8 can include a housing, housing portion, or cover 31 for housing and positioning the beam combiner 36 along viewing optical axis A, between lens assemblies 24 and 20, and secured to housing portions 33 and 35. The backlight/display assembly 34 can be positioned within housing 31 adjacent to or against one side of the beam combiner 36, and the display optical axis B can be at a 90° or right angle to viewing optical axis A. The display electronics 40 can be housed within housing 31 at a position spaced apart from another side of the beam combiner 36. This can incorporate the active display overlay unit 32 within direct viewing optics 12 such as a rifle scope, while minimizing any increases in size of the scope.

Figure 11:
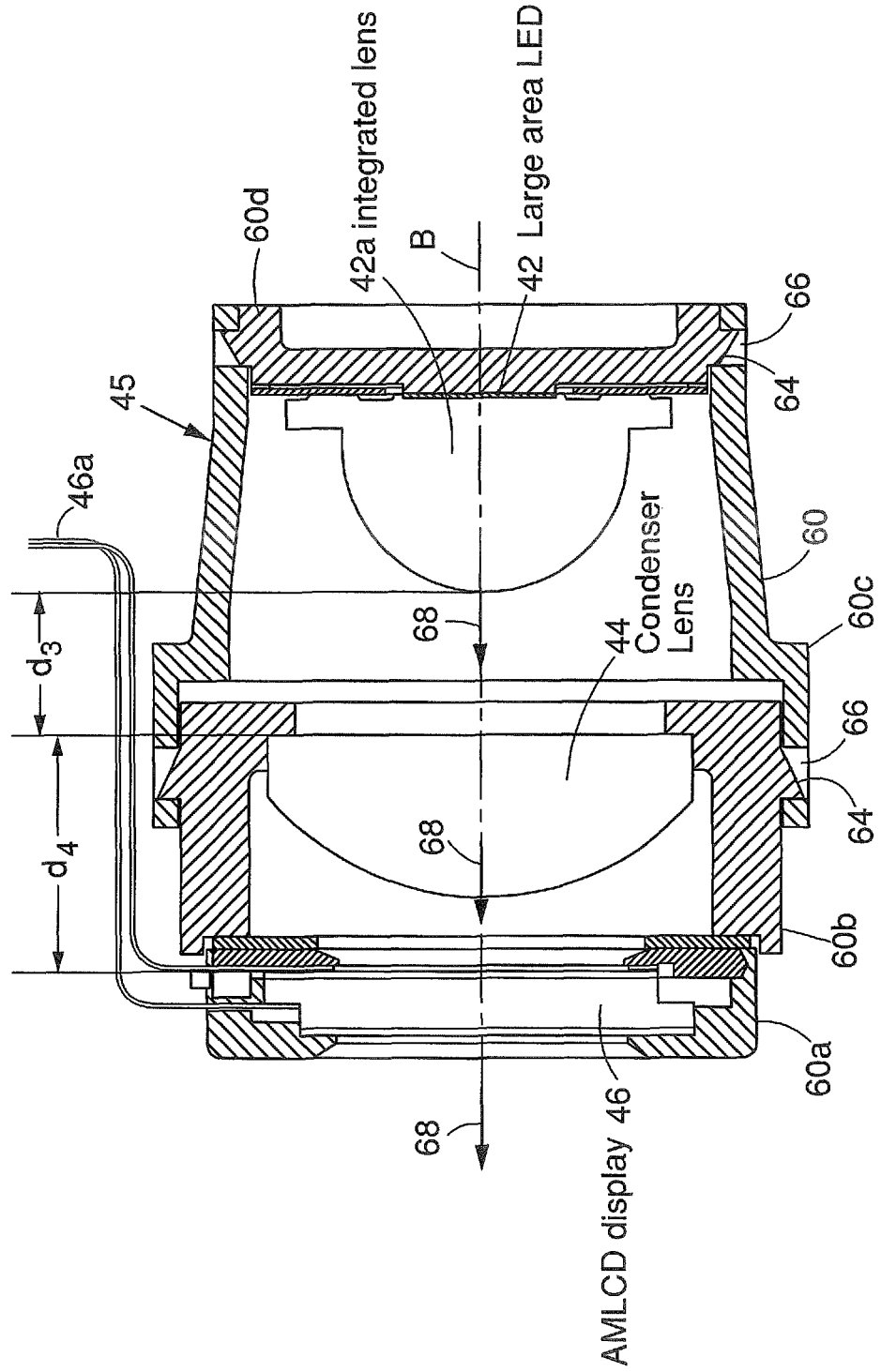
FIG. 11 is a schematic sectional view of the embodiment of FIG. 10.

Referring to FIGS. 10 and 11, the embodiment of the backlight/display assembly 34 in FIG. 9 can be generally rectangular in shape. Housing portions 60d and 60c can be secured to respective housing portions 60c and 60b, by insertion of locking protrusions 64 into recesses 66. The active matrix display 46 can be a 640×480 monochrome display and the light source 42 can be a large area LED with a first or integrated lens 42a. The integrated lens 42a can have a generally hemispherical shape with a generally spherical front face and can collect maximum available light generated from the light source 42 and direct the light 68 to a second, illumination, or condenser lens 44, positioned between the light source 42 and the active matrix display 46, all along display optical axis B. The condenser lens 44 can have a generally flat rear face or surface facing integrated lens 42, and a generally spherical front face with a larger radius than on the integrated lens 42a for concentrating light 68 received from integrated lens 42a onto active matrix display 46 in an efficient manner. The first lens 42a is shaped to collect a maximum amount of light 68 available from light source 42, and the second lens is shaped and positioned to collect and direct the received light 68 onto active matrix display 46 in a manner that provides uniform maximum brightness across the active matrix display 46. The front face of the integrated lens 42a can be spaced from the rear face of condenser lens 44 by a distance $d_3$, for example about 4 mm, and the front face of condenser lens 44 can be spaced from the rear face of active matrix display 46 by a distance $d_4$, for example about 2 mm. The light source 42 can be positioned within housing portion 60c, the condenser lens 44 can be positioned within housing portion 60b, and the active matrix 46 can be positioned within housing portion 60a, all secured along display optical axis B. This backlight/display assembly 34 with the two stage lens arrangement can have a very high brightness to power efficiency, with a monochrome luminance of at least 5000 fL or greater to the ocular of the host system at 332 mW, and can have about a 300:1 or greater contrast. A 5000 fL or greater luminance at 332 mW can provide a luminance to power fL:mW ratio of at least 15:1 or greater. Such luminance provided to the viewing optical axis A can allow the overlayed images 54 to be daytime viewable, while being power efficient.

Figure 12:
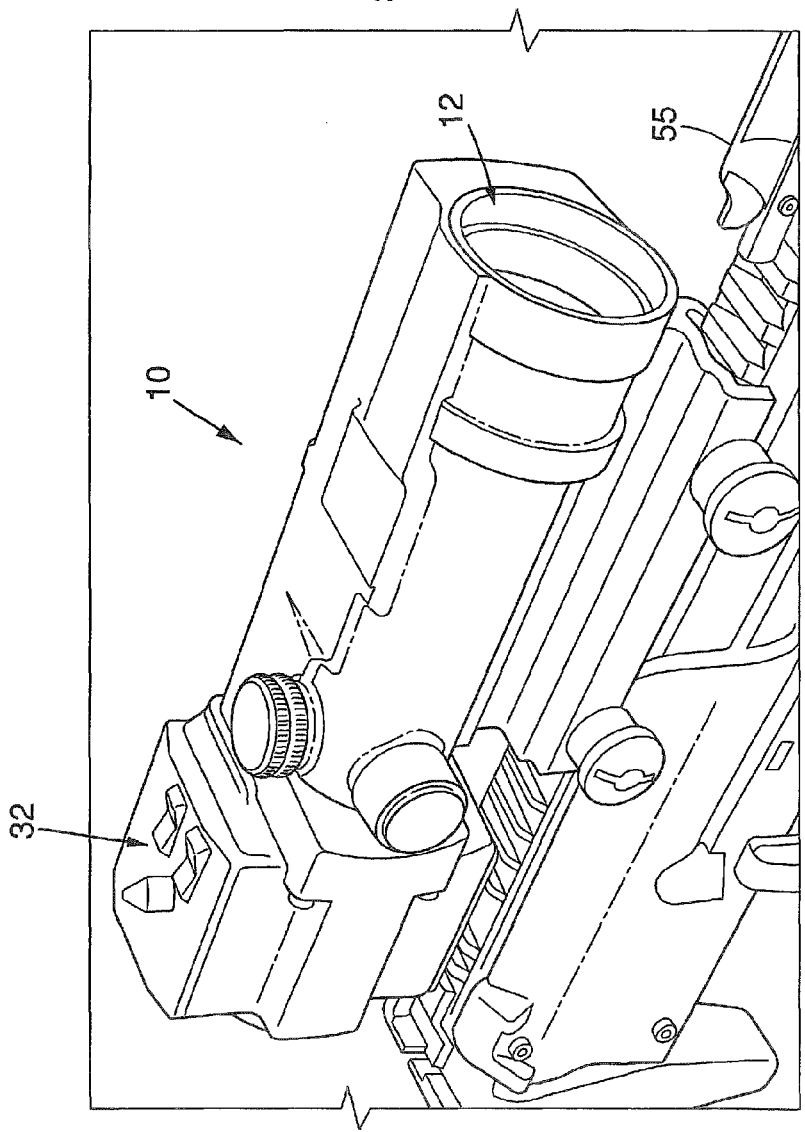
FIG. 12 is a perspective view of an embodiment of the present invention including a 3.5×35 ACOG sight on a gun.

FIG. 12 depicts an example of an embodiment of a viewer 10 attached to a weapon, gun or rifle 55, in which the direct viewing optics 12 is a 3.5×35 ACOG sight (Advanced Combat Optical Gunsight) or scope, which can be fixed magnification. The viewer 10 can include the backlight/display assembly 34 seen in FIGS. 10 and 11, and can have a 640×480 monochrome active matrix display 46. The backlight/display assembly 34 can be part of an active display overlay unit 32 that can provide daytime viewable images 54 such as an overlay reticle system and can provide an image field such as shown and described for FIG. 4. The backlight/display assembly 34 can provide a monochrome luminance of at least 5000 fL or greater to the ocular of the host system at 332 mW, and can have about a 1,000,000:1 dimming range. A 5000 fL or greater luminance at 332 mW can provide a luminance to power fL:mW ratio of at least 15:1 or greater. Some embodiments can provide monochrome luminance at such levels to the eye.

Referring to FIGS. 13-15, the backlight/display assembly 34 and the beam combiner 36 of the active display overlay unit 32 of FIG. 12 can be horizontally aligned along display optical axis B at a right angle to viewing optical axis A. The beam combiner 36 can have a coating 36c with 50/50 non-polarizing coating, or implemented with a coating customized for red LED wavelength and s-polarization. The display electronics 40 can be positioned offset from and under the beam combiner 36 and backlight/display assembly 34.

Figure 16:
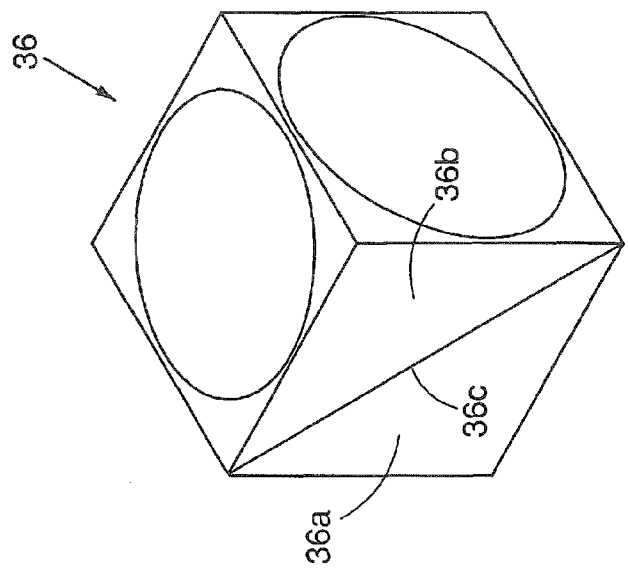
FIG. 16 is a schematic perspective view of an embodiment of a beam combiner.

Referring to FIG. 16, in some embodiments, the beam combiner 36 of the active display overlay unit of FIG. 12 can be cube shaped and formed of two optical members or elements 36a and 36b combined or bonded together. The coating 36c can be formed by coating one or both bonded hypotenuse surfaces with an optical thin film coating so that photopically weighted transmission (450 nm to 650 nm) for non-polarized light is greater than 90% for angles of incidence of 45°+/−8°. Reflectance (615 nm to 650 nm) for s-polarized light is greater than 90% for angles of incidence of 45°+/−8°. Anti-reflection coating can be applied to surfaces such that photopically weighted reflectance (450 nm to 650 nm) for non-polarized light is less than 0.5% for angles of incidence of 0°+/−10°. Anti-reflection coating can be applied to surfaces such that photopically weighted reflectance (615 nm to 650 nm) for non-polarized light is less than 0.5% for angles of incidence of 0°+/−10°. This can form a customized red s-polarized reflective coating for the beam combiner 36. It is understood that different coatings can be applied to beam combiner 36 to meet the requirements of different embodiments in the present invention, shown and described.

Figure 17:
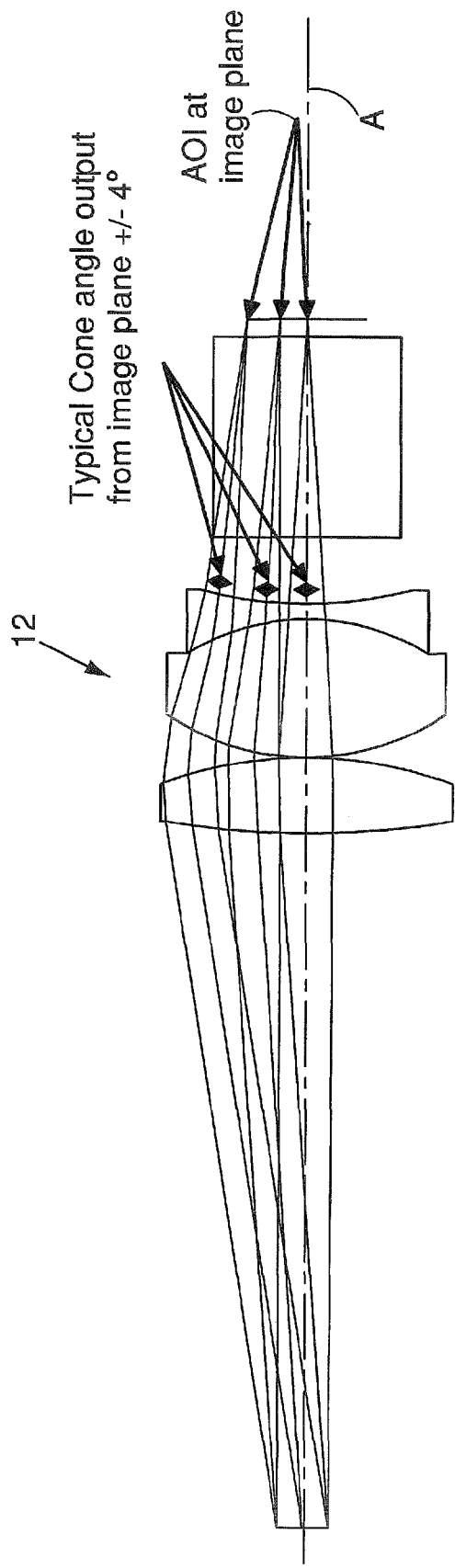
FIG. 17 is a schematic drawing of an embodiment of direct view optics.

Referring to FIG. 17, the direct viewing optics 12, such as in a weapon sight such as a rifle or gun sight or scope, can have well defined and limited angles of incidence (AOI) at the image plane, and can have small cone angles of illumination at the image plane less than about +/−10°, such as +/−4°. Embodiments of the active display overlay unit 32 can be configured to provide illumination that matches, or approximately or substantially matches the angles of incidence of the direct viewing optics 12 at the image plane to obtain optimum simultaneous viewing at the eyepiece 25 of images from both optical axes A and B, for images 51 viewed by the direct viewing optics 12, and for images 54 generated by active display overlay unit 32.

Figure 18:
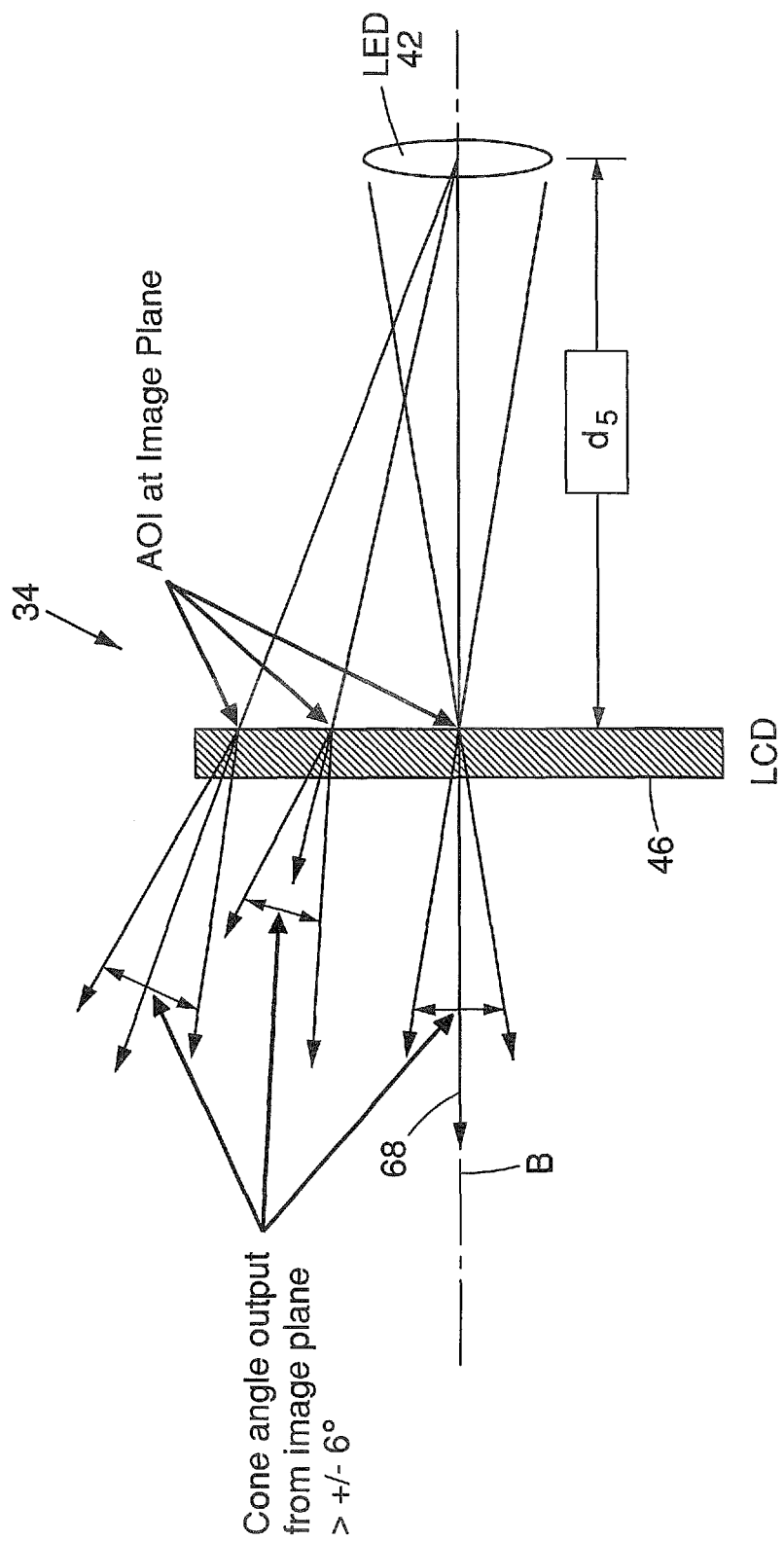
FIG. 18 is a schematic drawing of one embodiment of a backlight/display assembly arrangement.

Referring to FIG. 18, in one embodiment, the backlight/display assembly 34 for the direct viewing optics 12 of FIG. 17 can have a light source 42, such as an LED illuminating the active matrix display 46, which can be an LCD such as shown and described with respect to FIG. 5. The backlight/display assembly 34 can be similar to that in FIG. 7. The LED light source 42 can be positioned a distance $d_5$ from the active matrix display 46, and can directly illuminate the active matrix display 46, with light 68 to produce a very high luminance of the surface of the active matrix display 46 to obtain a high luminance of images 54 in the eyepiece 25 of the direct viewing optics 12, while matching, or approximately or substantially matching the images of incidence and cone angles at the image plane of the direct viewing optics 12. The size and location of the light source 42 relative to the active matrix display 46 can be selected to provide desired angles of incidence and cone angles of illumination of light 68 at the active matrix display 46. In direct illumination of active matrix display 46 by light source 42, the illumination or light 68 is under divergent conditions. In one embodiment, the light source 42 can be a large area LED with dimensions of about 3×3 mm at a distance $d_5$ of about 14 mm and provide about +/−6° of cone angle output from the image plane of the active matrix display 46. In another embodiment, the light source 42 can be a medium area LED of about 1×1 mm at a distance $d_5$ of about 14 mm and provide about +/−2° of cone angle output from the image plane of the active matrix display 46. In another embodiment, the light source 42 can be a small area LED of about 0.5×5 mm at a distance $d_5$ of about 14 mm, and provide about +/−1° of cone angle output from the image plane of the active matrix display 46. As a result, cone angles of +/−6° or less can be achieved to match or substantially match, or approximately match the direct viewing optics 12. The angles of incidence can be halfway between or bisect the cone angles as shown. In some embodiments, light source 42 can have an integrated lens 42*a* if desired.

Figure 19:
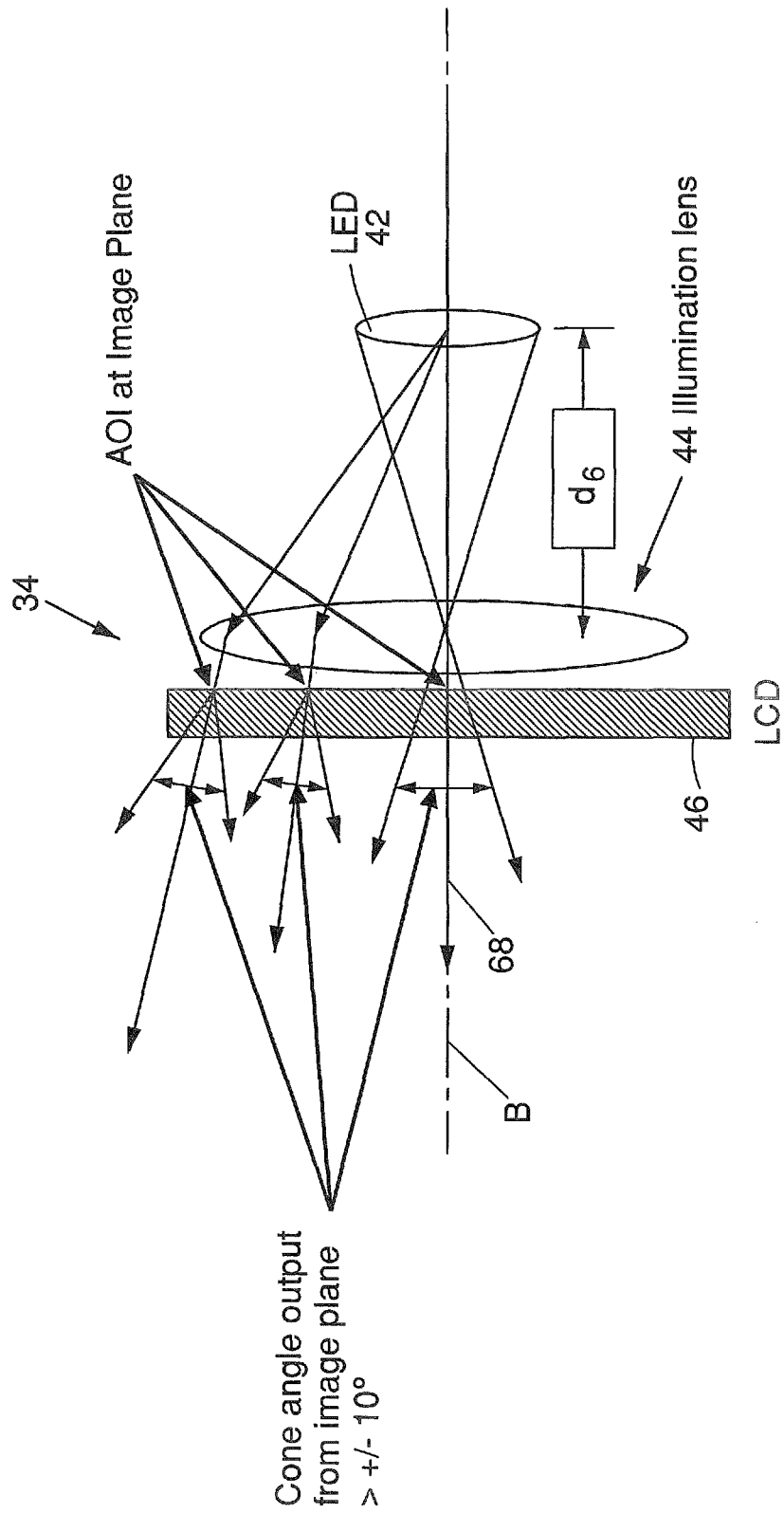
FIG. 19 is a schematic drawing of another backlight/display assembly arrangement.

Referring to FIG. 19, in another embodiment, the backlight/display assembly 34 for the direct viewing optics 12 of FIG. 17 can have a light source 42, such as an LED for illuminating the active matrix display 46, which can be an LCD such as shown and described with respect to FIG. 5. A condenser or illumination lens 44 can be positioned between the light source 42 and the active matrix display 46, and can be spaced apart from the light source 42 by a distance $d_6$, and the assembly can be similar to any of the backlight/display assemblies 34 shown in FIGS. 1-3 and 9-11. The lens 44 can be in front of and adjacent to or next to the active matrix display 46 and receives light 68 from light source 42 and directs the light 68 onto the active matrix display 46 in a manner to obtain a high luminance of images 54 in the eyepiece 25 of the direct viewing optics 12, while matching, or approximately or substantially matching the angles of incidence and cone angles at the image plane of the direct viewing optics 12. The size and location of the light source 42 relative to the active matrix display 46 and the lens 44 can be selected to provide desired angles of incidence and cone angles of illumination or light 68 at the active matrix display 46. In one embodiment, the light source 42 can be a large area LED with dimensions of about 3×3 mm at a distance $d_6$ of about 8 mm and provide about a +/−10° of cone angle output from the image plane of the active matrix display 46. In another embodiment, the light source 42 can be a medium area LED of about 1×1 mm at a distance $d_6$ of about 8 mm and provide about a +/−3.3° of cone angle output from the image plane of the active matrix display 46. In another embodiment, the light source 42 can be a small area LED of about 0.5×0.5 mm at a distance of about 8 mm and provide about a +/−1.6° of cone angle output from the image plane of the active matrix display 46. As a result, cone angles of +/−10° or less can be achieved to match, or approximately or substantially match the direct viewing optics 12. The angles of incidence can be about halfway between or bisect the cone angles, as shown. The lens 44 and its design can allow angles of incidence of illumination at the active display to match, or approximately or substantially match viewing optics that are divergent or convergent independent of light source 42 distance. In some embodiments, the light source 42 can include an integrated lens 42*a*. The designs of the backlight/display assemblies 34 and active display overlay unit 32 shown and described can provide high luminance images 54 to be produced in a manner that can be seen simultaneously with images viewed with the direct viewing optics, even during the day.

The viewer 10 in the present invention, can have a variety of uses and embodiments, and can be a weapon sight, such as a rifle sight or scope, a sighting and surveillance system, a fire-control system, a laser target locator and designator, a range finder, a monocular or binocular viewing system (either hand-held or head/helmet mounted), or add-on accessory devices thereof, and the field of view can include target elements therein. The viewing optics can be positioned along a longitudinal viewing optical axis or folded such as in a periscope. The active display overlay unit can include a display element for generating the images, including text and symbology along a display optical axis. A beam combiner or other means to optically combine the images can be aligned with the display along the display optical axis, and positioned along the viewing optical axis of the viewing optics for directing the images from the display onto the viewing optical axis for combining with the field of view that is viewed by the viewing optics with those of the display in an overlaid manner. The display optical axis of the active display overlay unit can be at any angle to the viewing optical axis of the viewing optics, and can include right angles. The active display overlay unit can utilize a reflective display element, a transmissive display element or an emissive display element, which can be an active display. It can further include an LED backlight for illuminating a transmissive display or active display with LED illumination. A lens arrangement can focus or concentrate the LED illumination onto the transmissive display or active display and into the viewing area. Electronics can control the display, the display format and content as well as the relative position of imagery and symbology with respect to the viewing optical axis. The display can provide text, alpha-numerics, symbology and/or video imagery including an active target reticle, range and wind information, GPS and compass information, target ID, and/or external sensor information.

The display overlay unit can receive external information and display a weapon solution based upon a ballistic calculation and environmental conditions such as temperature, altitude, humidity, wind velocity, air density and earth rotation coupled with target and ballistics information such as range to target, wind profile to target, specific rifle bore, shot load, barrel length and target speed. The display overlay unit may contain an internal symbol set and position symbology according to external commands or receive display information and position externally. The display overlay unit can output or provide monochrome, multi-color and/or full color overlaid image content, can be bi-level and/or full gray-scale image capable and can provide a high brightness display with dimming capability to support a wide range of ambient viewing conditions ranging from full sunlight to overcast starlight. In particular embodiments, the display overlay unit can provide at least one of full-color and monochrome luminance of at least about 1200 fL to the ocular of the host system with a luminance to power fL:mW ratio of at least about 6:1 or greater, for example, full color luminance of at least about 1200 fL or greater at about 200 mW, or monochrome luminance of at least about 5000 fL or greater at about 332 mW. The dimming range and spectral content or specific wavelength of imagery of the display can be such that the display can be dimmed to a level allowing the user to view the overlaid image and real-world scene through the viewing optics with image intensifier (night vision goggle) based products or thermal imaging devices.

A housing can be included for containing the viewing optics and the display overlay unit. The complete unit can be mounted as an external accessory device which is then coupled to the real-world optical viewing device or integrated into a larger system such as a fire-control, target locator/designator or weapon sight system. The unit can be packaged as an integral part of the real-world viewing system. In some embodiments, the active overlay display function can be an add-on accessory device to the real-world viewing system. The accessory device can contain features both mechanically and electrically to boresight (align) the overlaid display from the display overlay unit to the optical axis of the real-world viewer.

Figure 20:
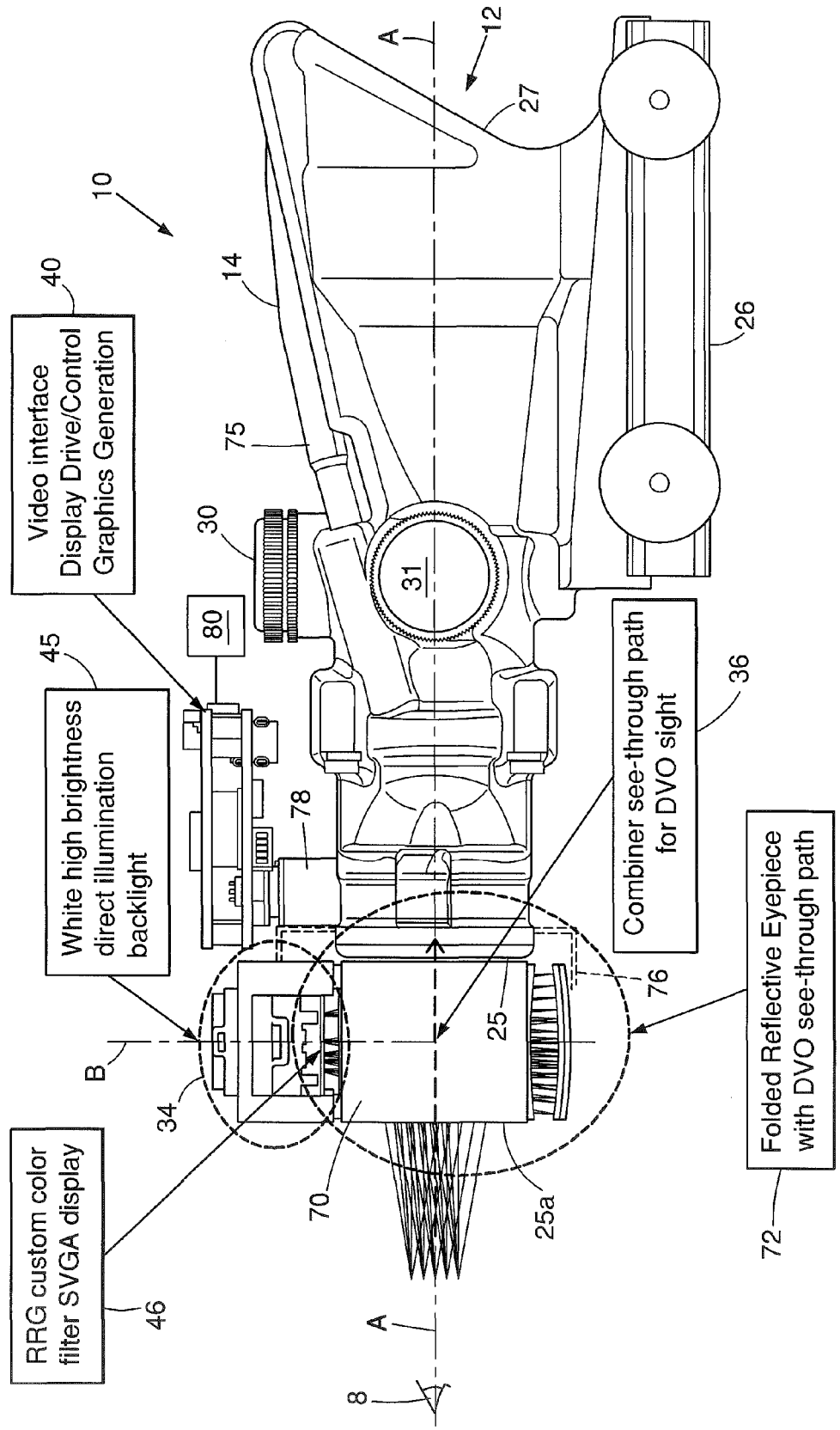
FIG. 20 is a schematic side view of an embodiment of a sight, scope or viewer in the present invention having an active display overlay unit positioned at the output end.
Figure 21:
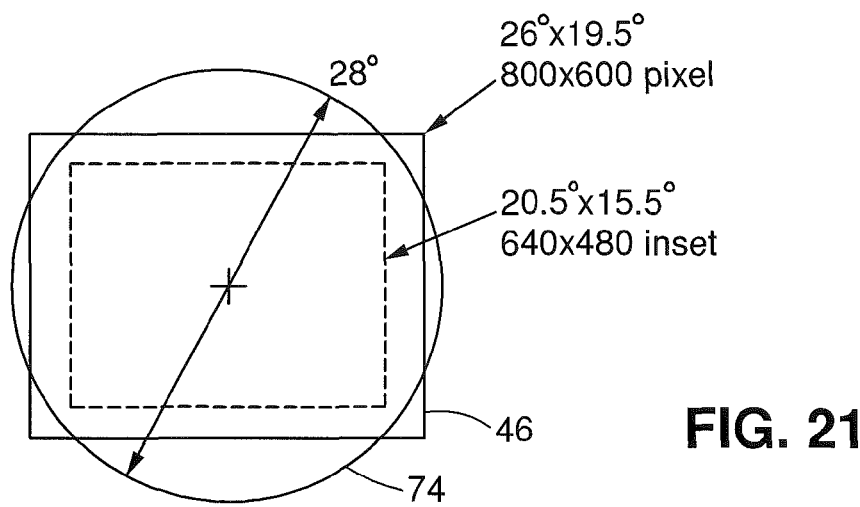
FIG. 21 is a schematic drawing showing an optical size relationship of an embodiment of an active matrix display in the active display overlay unit in FIG. 20.
Figure 22:
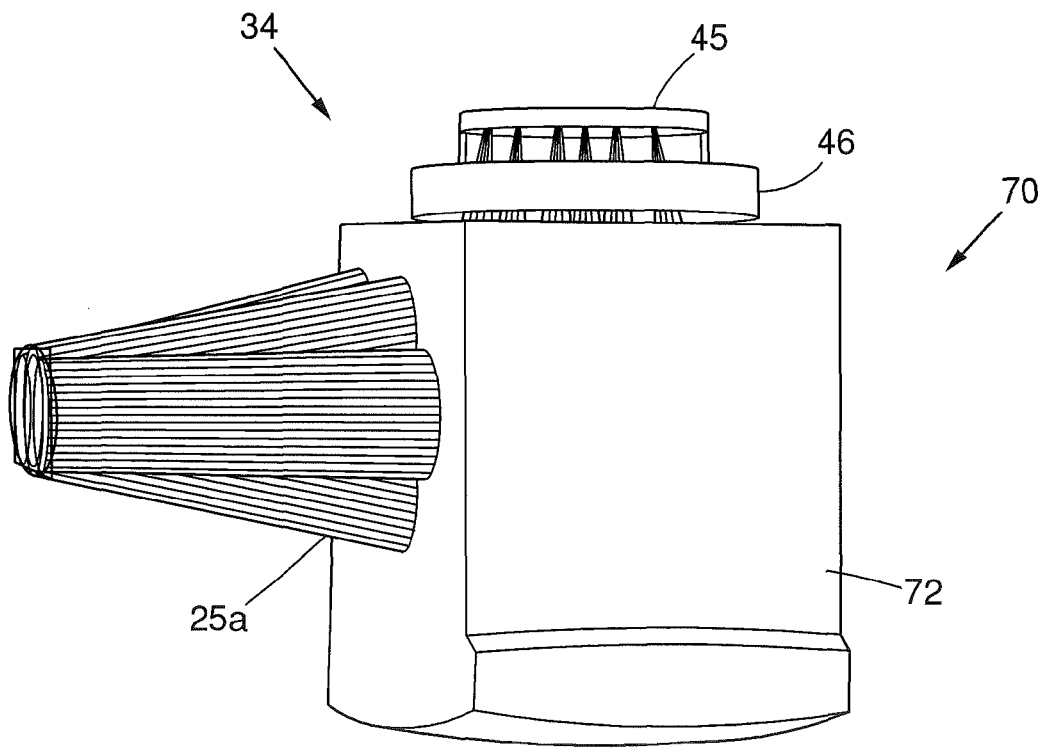
FIG. 22 is a schematic perspective view of an embodiment of an active display overlay unit in FIG. 20.

Referring to FIGS. 20-22, viewer 10 is another embodiment in the present invention that can have a variety of uses, such as those previously discussed and can have similar components. In one embodiment, viewer 10 can include an existing viewer 75 onto which an active display overlay unit 70 can be secured, attached, retrofitted or clipped onto, such as at the rear of the eyepiece 25. The active display overlay unit 70 can be added on, or attached, to an existing viewer 75 without interfering with the optical functionality of the viewer 75. The existing viewer 75 can be a weapon sight, rifle or gun sight or scope, including direct viewing optics (DVO) 12 positioned within a housing 14, and can be for example in one embodiment, a Trijicon ACOG® sight. The existing viewer 75 can have components that are the same or similar to various components in embodiments of viewers previously discussed, but without the active display overlay unit 32 positioned between the viewing input end 27 and the eyepiece 25. The existing viewer 75 can also be other viewers as previously described.

The active display overlay unit 70 can be an attachment that is secured to the eyepiece 25 of the viewer 75 along viewing optical axis A by a housing, housing portion, cover, clamp or an adapter 76, which can be part of the active display overlay unit 70, or can be a separate component. The active display overlay unit 70 can be similar to active display overlay unit 32, and can be optically coupled to the viewing optical axis A adjacent to the eyepiece 25 and ocular lens assembly 24, for generating images 54 along the optical axis A for simultaneous overlaid viewing of the generated images 54 and images 51 of the real-world scene received from viewer 75 and the direct viewing optics 12, while looking through the eyepiece 25a of active display overlay unit 70 with eye 8. The user can look through the active display overlay unit 70 which is in front of the existing viewer 75 or between the user and the viewer 75, and continuing viewing extending through the eyepiece 25 and direct viewing optics of viewer 75.

The active display overlay unit 70 can include a backlight/display assembly or device 34 having a backlight assembly 45 and an active matrix display 46, which can direct generated images 54 along display optical axis B. A beam combiner 36 in the active display overlay unit 70 can redirect the images 54 from the display optical axis B onto the viewing optical axis A for simultaneously superimposing or overlaying of the images 54 onto the images 51 of the scene viewed by the viewer 75 through the optics 12. In some embodiments, the backlight/display device 34, backlight assembly 45, active matrix display 46 and beam combiner 36 can be similar to those previously shown and described. The beam combiner 36 can be positioned or mounted along the viewing optical axis A below the backlight/display device 34. In some embodiments, the backlight/display device 34 can be positioned or mounted offset to the lateral side or bottom of the beam combiner 36. The portion of the active display overlay unit 70 that is in line with the viewing optical axis A can be a folded reflective see through eyepiece 72 and can include a reflective surface or mirror on the opposite side of the beam combiner 36 from the backlight/display device 34 for reflecting light back to the beam combiner 36.

In some embodiments, the backlight assembly 45 can include a white high brightness direct illumination backlight or light source 42. The display electronics 40 can be electrically connected to the backlight/display device 34 and can provide video interface, display drive/control and graphics generation capabilities. The display electronics 40 can be mounted to the housing 14 by mount 78, or can be mounted to or within a housing containing the active display overlay unit 70.

In some embodiments, the active matrix display 46 can be a Red, Red, Green (RRG) custom color filter super video graphics array (SVGA) display. The active matrix display 46 can have an array of 800×600 pixels and 26°×19.5° optical angle, with a 640×480 pixel inset and 20.5°×15.5° optical angle, which can fit within a 28° optical angle. The beam combiner 36 can be effective focal length (EFL) 25 mm, high index polarizing prism S-LAH60, 25 mm tall, 30 mm wide and 20 mm thick, with a neutral polarizing coating nominally 50% see through.

In some embodiments, the luminance of the backlight/display assembly 34 at 500 mW white high brightness backlight power can be about 3596 fL luminance for the color yellow, about 1628 fL luminance for the color red, about 1395 fL luminance for the color green, and about 24 fL luminance for the color black. The average luminance of yellow, red, green and black averaged equally together can be about 1660 fL luminance. Since black reflects very little light, the average luminance of yellow, red or green averaged equally together gives a value of about 2206 fL luminance. A 3596 fL luminance at 500 mW for the color yellow can provide a luminance to power fL:mW ratio of about 7:1. It can be seen that full color luminance of at least 1200 fL is provided. Although the luminance to power fL:mW ratios for red, green and black can be below 6:1, about 3.3:1 for red, about 2.8:1 for green, and about 0.05:1 for black, depending upon the percentage of these colors together with yellow, a fL:mW ratio of at least 6:1 can in some instances be possible, or at least portions of the luminance of a full color image can have a 6:1 ratio.

Embodiments of the active display overlay unit 70 can be configured to provide illuminated images 54 that matches, or approximately or substantially matches the angles of incidence of the direct viewing optics 12 to obtain optimum simultaneous viewing at the eyepiece 25a, from both optical axes A and B, for images 51 viewed by the direct viewing optics 12, and for images 54 generated by the active display overlay unit 70.

A sensor system or arrangement 80 can be electrically connected to the electronics 40. The sensor system 80 can include a sensor, such as a light sensor, which can cause the backlight/display assembly 34 and/or light source 42 to automatically adjust scene brightness as a function of ambient scene illumination. Sensor system 80 can also include a sensor for putting the active display overlay unit 70 into sleep mode in the absence of the user viewing through the viewer 10, to minimize power consumption and light emission. Such a sensor can be a proximity, motion or pressure sensor, or a limit switch. The sensor system 80 can also include long wave infrared, short wave infrared and solid state low light level sensors to align and provide an overlay of night vision scenes from an external night vision system. An image sensor in the sensor system 80 can help automatically measure boresight to a photo-patterned reticle, which can be internal. In addition, positional orientation sensors or image sensors in the sensor system 80 can see the photo-patterned reticle and optical and overlay aligned electronic imagery, such as from a night vision sensor and a disturbed reticle for enabling alignment, including electronic boresight measurement and alignment. Sensor system 80 can also include other suitable sensors.

Figure 23:
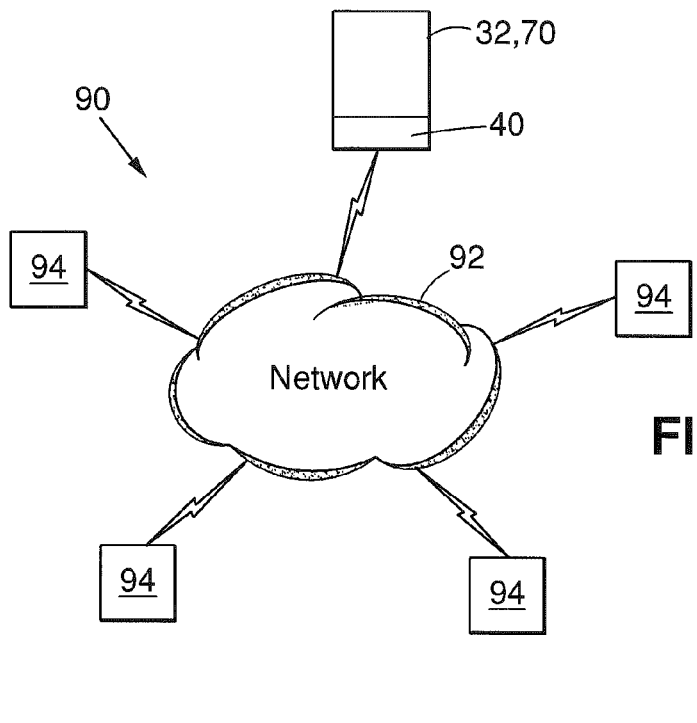
FIG. 23 is a schematic drawing of a network in embodiments of the present invention.

FIG. 23 illustrates an embodiment of a computer or electronics network or similar digital processing environment 90 in which the active display overlay units 32 and 70, display 46 and associated electronics 40 for viewer 10 can be implemented. The electronics 40 and any interfaced devices and computers 94 can provide processing, storage, input/output devices, executing application programs, and the like. Devices 94 can be linked to electronics 40 via a communications network 92, which can include hard wired and/or wireless connections or interfaces. Devices 94 can include, for example, range finders, sighting systems, viewing systems, targeting systems, sensors, smart phones, night vision systems, video cameras, ballistics computers, personal computers, etc., and can be linked through communications network 92 to other devices and computers. Communications network 92 can be wired or wireless connections, part of a remote access network, a global network (such as the internet), a worldwide collection of devices or computers, local area or wide area networks, and gateways that currently use respective protocols (TCP/IP, Bluetooth, etc.) to communicate with one another. Other electronic device/computer network architectures are suitable.

Figure 24:
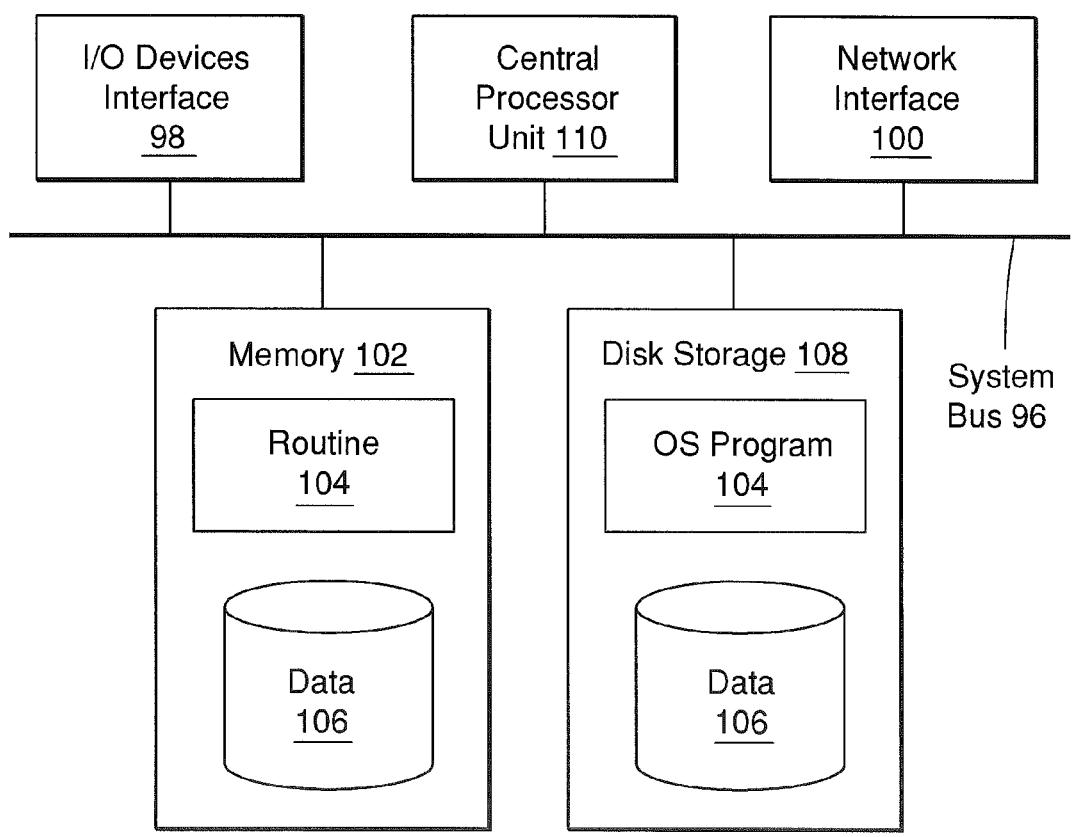
FIG. 24 is a schematic drawing of an embodiment of an internal structure of electronics or devices in the network of FIG. 23.

FIG. 24 is a diagram of an embodiment of an internal structure of electronics 40 and/or some devices 94, or portions thereof, in the network of FIG. 23. Electronics 40 and/or devices 94 can each contain a system bus 96, where a bus can be a set of hardware lines used for data transfer among the components of a computer or processing system. Bus 96 can be a shared conduit that connects different elements of a computer system (for example, processor, disk storage, memory, input/output ports, network ports, etc.) that enables the transfer of information between the elements. An input/output (I/O) device interface 98 can be attached to bus 96 for connecting various input and output devices (which can include, for example, keyboard, mouse, displays, printers, speakers, cameras, sensors, smart phones, viewing, sighting and targeting systems, night vision systems, range finders, ballistics computers, personal computers, etc.) to the active display overlay units 32 or 70, or electronics 40 and any devices 94. A network interface 100 can allow connection to various other devices attached to a network, including network 92. The various other devices can include those previously mentioned. Memory 102 can provide volatile storage for computer software instructions 104 and data 106 used to implement embodiments and features of the present invention, or features of devices 94. Storage 108, which can include disk storage or other suitable storage, can provide non-volatile storage for computer software instructions 104 and data 106 used to implement embodiments and features of the present invention, or features of devices 94. A central processor unit 110 can also be attached to system bus 96 and provide for the execution of computer instructions.

The processor routines 104 and data 106 can be a computer program product, and can include computer readable medium (which can be, for example, a suitable removable storage medium) that provides at least a portion of the software instructions. Computer program product can be installed by any suitable software installation procedure as is well known in the art. At least a portion of the software instructions can be downloaded over a cable, communication and/or wireless connection. In some cases, the programs can be a computer program propagated signal product embodied on a propagation medium, and for example, a radio wave, infrared wave, a laser wave, a sound wave, or an electrical wave propagated over a network, or a global network such as the internet. Such carrier medium or signals can provide at least a portion of the software instructions for the routines or programs 104. In some instances, the propagated signal can be an analog carrier wave or digitized signal carried on the propagated medium. For example, the propagated signal can be a digitized signal propagated over a network, a telecommunications network, or a global network, such as the internet. The propagated signal can be a signal that is transmitted over the propagation medium over a period of time, such as the instructions for a software application sent in packets over a network over a period of milliseconds, seconds, minutes, or longer. The computer readable medium of the computer program product can be a propagation medium that the computer system can receive and read, such as by receiving the propagation medium and identifying a propagated signal embodied in the propagation medium. The term carrier medium or transient carrier can encompass the transient signals, propagated signals, propagated medium, storage medium and the like.

Embodiments of the viewer 10 and the active display overlay units 32 and 70 can have electronic boresight features. Boresight can be automatically measured to a photo-patterned reticle using an image sensor. Aligned electronic imagery, such as from a night vision sensor and a disturbed reticle can be overlaid, using positional orientation sensors or image sensors that can see the photo-patterned reticle and optical scene. A disturbed reticle, laser range finder (LRF) aiming pointer, etc. can be displayed, over real world images in conjunction with orientation/cant sensors. Four elements or colors can be simultaneously focused to the user by the active display overlay unit, and the illumination source can work or operate in conjunction with an ocular lens design to focus the illumination source to the user. A light sensor can be included to automatically adjust scene brightness of the active display as a function of ambient scene illumination. A proximity sensor can be included to put the active display overlay unit into sleep mode in the absence of the user viewing through the eyepiece to minimize power consumption and light emission. In addition, multiple modes of operation can be included, such as day, night and sleep.

The electronics 40 can contain, include or interface with a software based symbol generation capability that can interface to the external world via serial link and display character and symbol information generated by the active display over the field of view (FOV) based on specific command protocol and display list information. The active display overlay unit can have a brightness range and dimming capability that can be fully day time readable and night time viewable including with night vision goggles. A displayed menu driven user interface can be incorporated, which interfaces to the user controls that have tactile feel and comply with military audible detection criteria.

The active display overlay unit can be scalable to provide varying field of view and resolutions over varying sight or real world field of views. The electronics 40 can provide dual path processing and power consumption for symbology and video modes of operation. The backlight/display device can be configured as monochrome, which can include multiple narrow band colors, or full color. Low power bi-level symbology or full bit full color information can provided to the user on the active display. Some embodiments of the active display overlay unit can be packaged in a plug and play module to facilitate new product manufacturing as well as retrofit applications, and can be fully testable without the need for a host platform. See through and overlay display brightness can be maximized by utilizing polarized coatings in the see through path. The see through transmission and optical efficiency of the overlay display can be selectively altered by the selective use of coatings in the beam combining element. External and/or internal battery power can be provided for operation.

The viewer 10 and the active display overlay unit can be weapon fire shock compatible with the following Department of Defense (DOD) weapons, M2HB, M240B, M2406, M249, M16A1, M16A2, M16A4MWS, M4, M4A1, M4A1MWS, M203, MK19AGL, M107, M24 and M136. The active display overlay unit can be directly interfaced to a fielded STORM laser range finder that can provide range information to the user. The active overlay display unit can be configured to be compatible with existing clip on weapon sights, and can be transportable to multiple optical platforms, such as weapon sights, sighting systems, binoculars, telescopes and microscopes. The host platform optics or product, once integrated with the active overlay display unit, can preserve its optical viewing conditions and parameters. All modes and functions can have internal and/or external control. The overlay display can be inscribed or x-scribed onto the real world scene. The functionality of the host platform optics typically is not interfered or disturbed by the active display overlay unit when integrated together, which can include ocular focus, zoom, parallax, range and windage turret adjustment and illuminated reticle adjustments. The boresight of the host platform optics is not generally impacted by the integration with the active display overlay unit. The active display overlay unit can interface with external night vision systems including long wave infrared, short wave infrared and solid stable low light level sensors to provide an overlay of the night vision scene onto the real world scene. The active display overlay unit can be utilized in operational scenarios to provide target hand off, battlefield situational awareness, target ID, identification friend or foe (IFF), GPS and compass information, target reticle, range and wind information, and/or external sensor information. The active display overlay unit can be integrated and sealed against the intrusion of foreign particles, and with the host platform optics.

The power, size and performance efficiency of the active display overlay unit can be achieved at least in part by electronics 40 and associated software by implementing the entire storage, processing and display path as 1 bit/pixel with a 32 bit graphics processor acting on up to 32 pixels at once. A bi-level graphics display system can translate 8 bit processor accesses into 1 bit graphics in order to allow existing video graphics rendering software to work without modification. A backlight regulation or control system can maintain consistent brightness on the active display over variations in temperature and construction. An automatic brightness control system can maintain constant symbology contrast with respect to the ambient environment. A symbology display system can implement simultaneous static and dynamic symbology layers to allow moving symbology to overlap static symbology temporarily without need to redraw the background static symbology on the active display. A double buffered, bi-level symbology system can allow objects to be drawn, moved, and erased without any flickering or partial draws being visible to the user. An immediate/deferred draw graphics rendering scheme can allow multiple graphics to render to the symbology display with only a single synchronization operation, thereby allowing multiple on screen graphics to change every frame without any flickering or partially drawn objects being visible to the user. A symbology/video display system can be included to provide supplementary ballistics/targeting data which can be overlaid with electronic video, for example from a thermal camera. A backlight control system can allow greater than $10^7$ or 1,000,000:1 dimming range for operation conditions from full sunlight to viewing through an image intensifier device, with consistent brightness over all temperatures and process variations. Dual path bi-level symbology and full digital video processing provided by electronics 40 can allow power efficient operation in bi-level mode with the capability to provide full video and symbology overlay. Ballistics information and symbology overlay can be received via a wired interface such as UART, 12C or FPD-111, or a wireless interface such as Bluetooth or 802.11. Encrypted ballistics information can be received after wireless key pairing with an associated ballistics sensor device. Any narrowband display color can be implemented for compatibility with multiple optical combiner scenarios. A microdisplay can be used with custom backlight color/display color filter combinations, or display color filters matched to backlight colors, for optimum day mode power in conjunction with other video I/O modes. A symbology system can automatically determine graphics content using information from an embedded ballistics computer or ballistic data sensors. Useful overlay symbology can be generated using data from external devices such as STORM or IBEAM.

An easy to use clamping system can allow the active display overlay unit to be transported to or integrated to multiple sights having varying diameters, and mounted on multiple locations of the sights such as on the left, right or top. The active display overlay unit can be compact in size, so as not to obscure the user's sight, and can be placed along the diameter of the sight and rotated to an angle for user's best fit.

While this invention has been particularly shown and described with references to example embodiments thereof, it will be understood by those skilled in the art that various changes in form and details may be made therein without departing from the scope of the invention encompassed by the appended claims.

For example, various features can be combined together or omitted. In addition, dimensions and the orientation of components can be varied. In embodiments where the direct viewing optics 12 are folded, the viewing optical axis A can be folded and the display optical axis B can be aligned with one portion of the viewing optical axis A.

What is claimed is:

1. A viewer comprising:
   an active display overlay unit for optically coupling to a viewing optical axis of viewing optics, for generating images and directing the images along the viewing optical axis of the viewing optics for simultaneous overlaid viewing of the images and images of a real-world scene as viewed in a field of view through the viewing optics, the active display overlay unit capable of providing at least one of monochrome and full-color luminance of at least 1200 fL to an ocular of a host system with at least a portion having a luminance to power fL:mW ratio of at least 6:1 or greater.

2. The viewer of claim 1 in which the active display overlay unit comprises:
   an active display for generating the images along a display optical axis; and
   a beam combiner aligned with the display along the display optical axis, and positioned along the viewing optical axis of the viewing optics for directing the images from the display onto the viewing optical axis for combining with the field of view that is viewed by the viewing optics in an overlaid manner.

3. The viewer of claim 2 in which the active display overlay unit further comprises:
   an active matrix transmissive display; and
   an LED backlight for illuminating the active matrix transmissive display with LED illumination.

4. The viewer of claim 3 in which the LED backlight is configured to provide a cone angle of illumination at the active matrix transmissive display that substantially matches the viewing cone angle of the viewing optics.

5. The viewer of claim 1 further comprising the viewing optics, the active display overlay unit being an add-on accessory coupled adjacent to an eyepiece of the viewing optics by an adapter.

6. The viewer of claim 5 in which optical viewing conditions and parameters of the viewing optics are preserved following integration with the active display overlay unit, including at least one of ocular focus, zoom, parallax, range and windage turret adjustment and illuminated reticle adjustments.

7. The viewer of claim 5 in which the viewing optics includes a photo-patterned reticle, the viewer further including a sensor arrangement for automatically measuring boresight to the photo-patterned reticle.

8. The viewer of claim 7 in which the sensor arrangement comprises at least one of positional orientation sensors and image sensors that see the photo-patterned reticle and optical scene for overlaying and aligning electronic imagery from at least one of a night vision sensor and a disturbed reticle.

9. The viewer of claim 1 further comprising a sensor for sensing ambient scene illumination for controlling brightness of the active display overlay unit as a function of ambient scene illumination.

10. The viewer of claim 1 further comprising a sensor for putting the active display overlay unit into sleep mode in the absence of a user looking through the viewer.

11. The viewer of claim 1 in which the active display overlay unit is configured for operating in multiple modes, including day, night and sleep.

12. The viewer of claim 1 in which the active display overlay unit is configured with a brightness range and dimming capability to be fully day time readable and night time viewable with the aid of night vision goggles.

13. The viewer of claim 1 in which the active display overlay unit can be configured to provide monochrome in multiple narrow band colors.

14. The viewer of claim 1 in which the active display overlay unit can be configured to provide at least one of low power bi-level symbology and full 24 bit full color information to the user.

15. The viewer of claim 1 further comprising an adapter configured to secure the active display overlay unit to the viewing optics of multiple optical platforms including weapon sights, sighting systems, binoculars, telescopes and microscopes.

16. The viewer of claim 1 in which the viewing optics has an existing boresight which is not impacted when the active display overlay unit is integrated with the viewing optics.

17. The viewer of claim 1 in which the active display overlay unit is capable of interfacing with an external night vision system including long wave infrared, short wave infrared and solid state low light level sensors to provide an overlay of the night vision scene onto the real-world scene.

18. The viewer of claim 1 in which the active display can provide images for at least one of target hand off, battlefield situational awareness, active target reticle, range and wind information, GPS and compass information, target ID, identification of friend or foe, and/or external sensor information.

19. The viewer of claim 1 in which the active display overlay unit includes a backlight regulation system, for maintaining consistent brightness over variations in temperature and construction.

20. The viewer of claim 19 in which the backlight regulation system can provide greater than $10^7$ dimming range for operation conditions from full sunlight to viewing through an image intensifier device, with consistent brightness over all temperatures and process variations.

21. The viewer of claim 1 in which the active display overlay unit includes an automatic brightness control system for maintaining constant symbology contrast with respect to ambient environment.

22. The viewer of claim 1 in which the active display overlay unit includes a microdisplay with custom backlight color, display color and filter combinations for optimum day mode power in conjunction with video I/O modes.

23. The viewer of claim 1 in which the active display overlay unit is capable of displaying at least one of a disturbed reticle and laser range finder aiming pointer over the real-world scene.

24. The viewer of claim 1 further comprising a clamping system capable of securing the active display overlay unit to multiple sights having varying diameters.

25. The viewer of claim 24 in which the clamping system can mount the active display overlay unit to a selected sight on multiple locations which can include top and lateral side locations.

26. The viewer of claim 1 in which the active display overlay unit includes dual path processing and power consumption for symbology and video modes of operation.

27. The viewer of claim 1 in which the active display overlay unit includes a symbology display system that is capable of implementing simultaneous static and dynamic symbology layers that allow moving symbology to overlap static symbology without redrawing the static symbology.

28. The viewer of claim 1 in which the active display overlay unit includes a double buffered bi-level symbology system that allows objects to be drawn, moved and erased without flickering or partial redraws being visible to the user.

29. The viewer of claim 1 in which the active display overlay unit includes an immediate/deferred draw graphics rendering scheme that allows multiple graphics to be rendered to an active matrix display with only a single synchronization operation, allowing multiple on screen graphics to change every frame without flickering or partially drawn objects being visible to the user.

30. The viewer of claim 1 in which the active display overlay unit includes dual path bi-level symbology and full digital video processing that allows power efficient operation in bi-level mode with capability to provide full video and symbology overlay.

31. A weapons sight comprising:
    direct viewing optics positioned along a longitudinal viewing optical axis for viewing a field of view of a real-world scene;
    an add-on accessory active display overlay unit optically coupled to the viewing optical axis of the viewing optics by an adapter, for generating images and directing the images along the viewing optical axis of the viewing optics for simultaneous overlaid viewing of the images and the real-world scene as viewed in the field of view through the viewing optics, the active display overlay unit capable of providing at least one of monochrome and full-color luminance of at least 1200 fL to an ocular of a host system with at least a portion having a luminance to power fL:mW ratio of at least 6:1 or greater, the active display overlay unit comprising an active matrix transmissive display for generating the images along a display optical axis, an LED backlight for illuminating the active matrix transmissive display with LED illumination.

32. A method of viewing with a real-world viewer comprising:
    viewing a field of view of a real-world scene with viewing optics positioned along a viewing optical axis; and
    simultaneously viewing images generated by an active display overlay unit optically coupled to the viewing optical axis of the viewing optics, the images being directed along the viewing optical axis of the viewing optics for simultaneous overlaid viewing of the images and the real-world scene as viewed in the field of view through the viewing optics, the active display overlay unit capable of providing at least one of monochrome and full-color luminance of at least 1200 fL to an ocular of a host system with at least a portion having a luminance to power fL:mW ratio of at least 6:1 or greater.

33. A method of viewing with a weapons sight comprising:

viewing a field of a real-world scene with direct viewing optics positioned along a longitudinal viewing optical axis;

simultaneously viewing images generated by an add-on accessory active display overlay unit optically coupled to the viewing optical axis of the viewing optics by an adapter, the images being directed along the viewing optical axis of the viewing optics for simultaneous overlaid viewing of the images and the real-world scene as viewed in the field of view through the viewing optics, the active display overlay unit providing at least one of monochrome and full-color luminance of at least 1200 fL to an ocular of a host system with at least a portion having a luminance to power fL:mW ratio of at least 6:1 or greater, the active display overlay unit comprising an active matrix transmissive display generating the images along a display optical axis, an LED backlight illuminating the active matrix transmissive display with LED illumination.

* * * * *